US009933722B2

(12) United States Patent
Tachibana et al.

(10) Patent No.: US 9,933,722 B2
(45) Date of Patent: Apr. 3, 2018

(54) IMAGE FORMING METHOD AND IMAGE FORMING APPARATUS FOR FORMING AN IMAGE BY SETTING VARIOUS PIXELS OF AN EXPOSURE PATTERN AS A NON-EXPOSURE PIXEL GROUP OR A HIGH-OUTPUT EXPOSURE PIXEL GROUP

(71) Applicants: Hiroto Tachibana, Kanagawa (JP); Hiroyuki Suhara, Kanagawa (JP); Yuichi Ueno, Kanagawa (JP)

(72) Inventors: Hiroto Tachibana, Kanagawa (JP); Hiroyuki Suhara, Kanagawa (JP); Yuichi Ueno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/193,480

(22) Filed: Jun. 27, 2016

(65) Prior Publication Data

US 2016/0378016 A1 Dec. 29, 2016

(30) Foreign Application Priority Data

Jun. 29, 2015 (JP) ................................ 2015-129475

(51) Int. Cl.
*G06K 15/02* (2006.01)
*H04N 1/52* (2006.01)
*G03G 15/043* (2006.01)

(52) U.S. Cl.
CPC .................................. *G03G 15/043* (2013.01)

(58) Field of Classification Search
USPC ......................... 358/1.1-3.29, 504, 505, 300
See application file for complete search history.

(56) References Cited

U.S. PATENT DOCUMENTS

| | | | |
|---|---|---|---|
| 2008/0056746 A1 | 3/2008 | Suhara | |
| 2009/0220256 A1 | 9/2009 | Suhara et al. | |
| 2010/0196052 A1 | 8/2010 | Suhara | |
| 2011/0216379 A1* | 9/2011 | Arakawa .................. | H04N 1/04 358/488 |
| 2012/0121208 A1* | 5/2012 | Moriya ................ | G06T 3/4007 382/300 |

(Continued)

FOREIGN PATENT DOCUMENTS

| | | |
|---|---|---|
| JP | 2003-251853 | 9/2003 |
| JP | 2008-153742 | 7/2008 |

(Continued)

*Primary Examiner* — Marcellus Augustin
(74) *Attorney, Agent, or Firm* — Oblon, McClelland, Maier & Neustadt, L.L.P.

(57) ABSTRACT

An image forming method is for forming an image using an electrostatic latent image that is formed by exposing a surface of an image bearer in accordance with an image pattern that includes a plurality of image areas in combination. Each of the plurality of image areas includes a plurality of pixels. A part of pixels to be exposed in each of the plurality of image areas is set as a non-exposure pixel group in accordance with a position of any one of the plurality of image areas in the image pattern. Pixels that are different from the non-exposure pixel group in each of the plurality of image areas are set as a high-output exposure pixel group that is exposed with an optical output value that is higher than a predetermined optical output value that is needed to expose the image area.

12 Claims, 41 Drawing Sheets

(56) References Cited

U.S. PATENT DOCUMENTS

| | | | | |
|---|---|---|---|---|
| 2014/0253658 | A1 | 9/2014 | Suhara et al. | |
| 2015/0042740 | A1 | 2/2015 | Suhara et al. | |
| 2015/0177638 | A1* | 6/2015 | Suhara ................. | G03G 15/043 399/177 |
| 2015/0331351 | A1* | 11/2015 | Suhara ................. | G03G 15/043 347/118 |
| 2015/0355568 | A1 | 12/2015 | Tachibana et al. | |
| 2016/0004181 | A1 | 1/2016 | Suhara et al. | |
| 2016/0070195 | A1 | 3/2016 | Tachibana et al. | |

FOREIGN PATENT DOCUMENTS

| | | |
|---|---|---|
| JP | 2009-282349 | 12/2009 |
| JP | 2010-181570 | 8/2010 |

* cited by examiner

2-DOT ISOLATED PATTERN

2-BY-2 PATTERN

2-DOT LINE PATTERN

IMAGE FORMING METHOD AND IMAGE FORMING APPARATUS FOR FORMING AN IMAGE BY SETTING VARIOUS PIXELS OF AN EXPOSURE PATTERN AS A NON-EXPOSURE PIXEL GROUP OR A HIGH-OUTPUT EXPOSURE PIXEL GROUP

CROSS-REFERENCE TO RELATED APPLICATION

The present application claims priority under 35 U.S.C. § 119 to Japanese Patent Application No. 2015-129475, filed Jun. 29, 2015. The contents of which are incorporated herein by reference in their entirety.

BACKGROUND OF THE INVENTION

1. Field of the Invention

The present invention relates to an image forming method and an image forming apparatus.

2. Description of the Related Art

There are typical image forming apparatuses that is known to the inventor, and that forms images during exposure on an image bearer with strong light in a short time period in accordance with image data so that the integrated energy of light is constant (e.g., see Japanese Unexamined Patent Application Publication No. 2008-153742).

However, according to the technique that is disclosed in Japanese Unexamined Patent Application Publication No. 2008-153742, if an image pattern includes multiple image areas like a multicolor image that includes, for example, multiple color plates, i.e., image areas, with different colors, it is difficult to prevent a reduction in the image quality due to the positional deviation that occurs between the image areas.

SUMMARY OF THE INVENTION

In accordance with one aspect of the present invention, an image forming method is for forming an image using an electrostatic latent image that is formed by exposing a surface of an image bearer in accordance with an image pattern that includes a plurality of image areas in combination. Each of the plurality of image areas includes a plurality of pixels. A part of pixels to be exposed in each of the plurality of image areas is set as a non-exposure pixel group in accordance with a position of any one of the plurality of image areas in the image pattern. Pixels that are different from the non-exposure pixel group in each of the plurality of image areas are set as a high-output exposure pixel group that is exposed with an optical output value that is higher than a predetermined optical output value that is needed to expose the image area.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
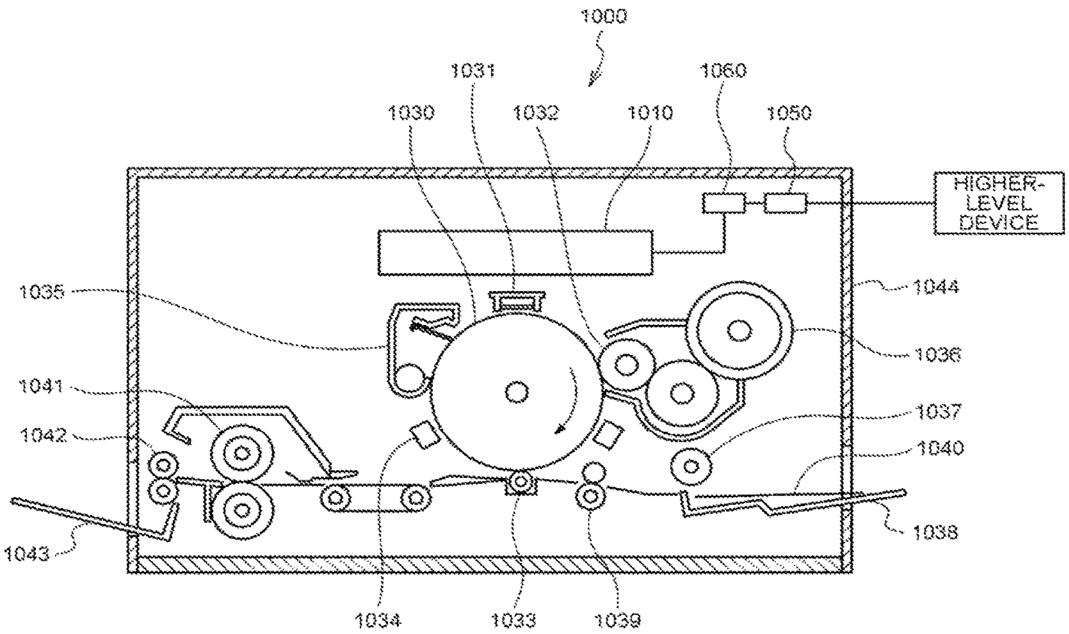
FIG. 1 is a central cross-sectional view that illustrates an embodiment of an image forming apparatus according to the present invention.

The terminology used herein is for the purpose of describing particular embodiments only and is not intended to be limiting of the present invention.

As used herein, the singular forms "a", an and the are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

With reference to the drawings, an explanation is given below of embodiments of an image forming method and an image forming apparatus according to the present invention.

An embodiment has an object to provide an image forming method with which it is possible to form an image, which includes multiple image areas, with a high image quality.

Image Forming Apparatus

An explanation is given of a laser printer 1000, which is an embodiment of the image forming apparatus according to the present invention.

FIG. 1 illustrates a schematic configuration of the laser printer 1000.

In the laser printer 1000, the devices for executing electrophotographic processes, such as charging, exposure, developing, transfer, or cleaning, are disposed around a photoconductor drum 1030 in the above-described order in the rotation direction of the photoconductor drum 1030. Furthermore, the laser printer 1000 includes a communication control device 1050 and a printer control device 1060 as devices that control the devices for executing the above-described electrophotographic processes.

Specifically, a charging device 1031 that executes a charging process, an optical scanning device 1010 that executes an exposure process, a developing device that executes a developing process, a transfer device 1033 that executes a transfer process, and a cleaning unit 1035 that executes a cleaning process are included. A neutralizing unit 1034 is disposed between the transfer device 1033 and the cleaning unit 1035.

The developing device includes a toner cartridge 1036 and a developing roller 1032 that attaches the toner, supplied from the toner cartridge 1036, to the surface of the photoconductor drum 1030 so as to develop latent images on the surface of the photoconductor drum 1030 with the toner.

The transfer device 1033 transfers a toner image on the surface of the photoconductor drum 1030 onto a recording sheet 1040, which is pulled from a sheet feeding tray 1038 by a sheet feeding roller 1037. The leading edge of the recording sheet 1040 is positioned by a registration roller 1039, and the recording sheet 1040 is conveyed to a fixing device 1041 in synchronization with the toner image on the surface of the photoconductor drum 1030. After the toner image is fixed by the fixing device 1041, the recording sheet 1040 is delivered to a paper ejection tray 1043 by a paper ejection roller 1042.

The above-described components of the laser printer 1000 are housed at predetermined positions inside a printer chassis 1044.

The communication control device 1050 controls a bidirectional communication with a higher-level device (e.g., an information processing apparatus such as a personal computer) via a network, or the like.

The printer control device 1060 includes a central processing unit (CPU) and a read only memory (ROM). Furthermore, the printer control device 1060 includes a random access memory (RAM) and an analog/digital (A/D) converter. The printer control device 1060 integrally controls each unit in response to a command from a higher-level device and sends image information from a higher-level device to the optical scanning device 1010.

The ROM stores programs, described in codes that are readable by the CPU, and various types of data that is used when the programs are executed. The RAM is a temporarily writable memory for tasks of the CPU. The A/D converter converts analog signals into digital signals.

The photoconductor drum 1030 is a latent-image bearer, which is a cylindrical member, and includes a photosensitive layer formed on the surface thereof. That is, the surface of the photoconductor drum 1030 is the surface to be scanned. The photoconductor drum 1030 is rotated by a driving mechanism in the direction of the arrow in FIG. 1.

The charging device 1031 uniformly charges the surface of the photoconductor drum 1030. As the charging device 1031, it is possible to use, for example, a contact-type charging roller that generates less ozone or a corona charger that uses corona discharge.

Figure 2:
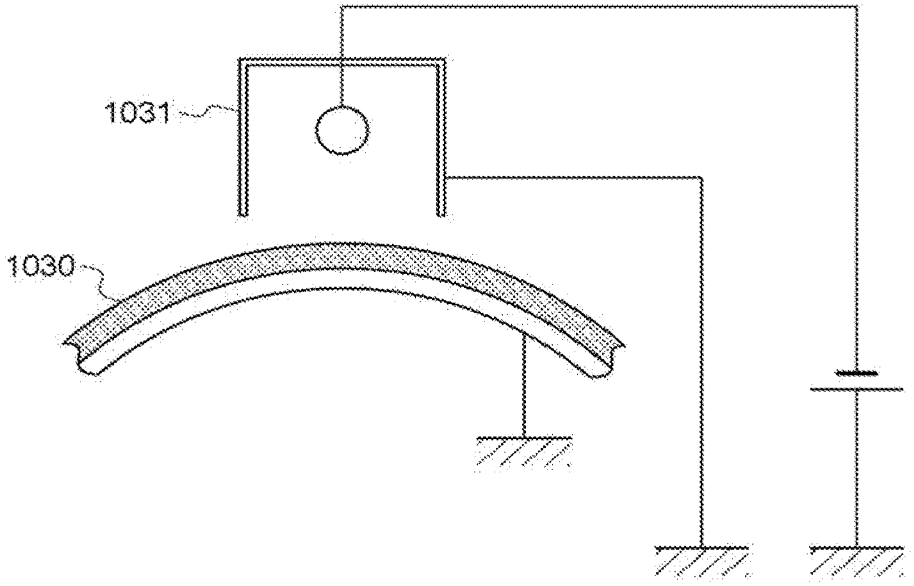
FIG. 2 is a schematic view that illustrates a corotron-type charging device of the above-described image forming apparatus.
Figure 3:
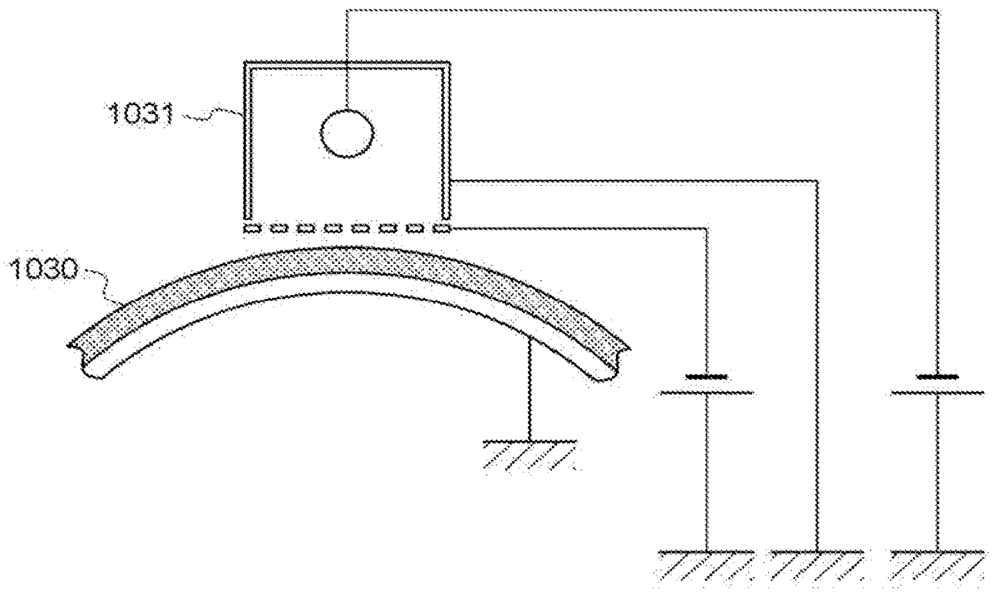
FIG. 3 is a schematic view that illustrates a scorotron-type charging device of the above-described image forming apparatus.

The charging device 1031 may be a corotron-type charging device that is illustrated in FIG. 2, a scorotron-type charging device that is illustrated in FIG. 3, or a roller-type charging device.

With reference back to FIG. 1, in the optical scanning device 1010, the surface of the photoconductor drum 1030 is charged by the charging device 1031 and is scanned and exposed with light using a light flux that is modulated based on the image information from the printer control device 1060. The electrostatic latent image, which corresponds to the image information, is formed on the surface of the photoconductor drum 1030.

The electrostatic latent image, formed by the optical scanning device 1010, is moved toward the developing device in accordance with the rotation of the photoconductor drum 1030. The optical scanning device 1010 will be explained later in detail.

The toner cartridge 1036 contains toner, which is developer. The toner is supplied to the developing roller 1032 from the toner cartridge 1036.

The developing roller 1032 attaches the toner, supplied from the toner cartridge 1036, to the latent image that is formed on the surface of the photoconductor drum 1030, thereby developing the electrostatic latent image. Here, the image (hereinafter, also referred to as "toner image") to which the toner is attached is moved toward the transfer device 1033 in accordance with the rotation of the photoconductor drum 1030.

The sheet feeding tray 1038 stores the recording sheets 1040. The sheet feeding roller 1037 is disposed near the sheet feeding tray 1038.

The sheet feeding roller 1037 delivers the recording sheets 1040 one by one from the sheet feeding tray 1038. The recording sheet 1040 is delivered from the sheet feeding tray 1038 toward the gap between the photoconductor drum 1030 and the transfer device 1033 in synchronization with the rotation of the photoconductor drum 1030.

In order to electrically attract the toner on the surface of the photoconductor drum 1030 to the recording sheet 1040, the voltage applied to the transfer device 1033 has the polarity opposite to the toner. Using this voltage, the toner image on the surface of the photoconductor drum 1030 is transferred onto the recording sheet 1040. The recording sheet 1040 onto which the toner image has been transferred is delivered to the fixing device 1041.

In the fixing device 1041, heat and pressure are applied to the recording sheet 1040, whereby the toner is fixed to the recording sheet 1040. The recording sheet 1040 to which the toner is fixed is delivered to the paper ejection tray 1043 via the paper ejection roller 1042 and is sequentially stacked on the paper ejection tray 1043 so that printed materials are produced.

The neutralizing unit 1034 neutralizes the surface of the photoconductor drum 1030.

The cleaning unit 1035 removes toner, i.e., residual toner, that remains on the surface of the photoconductor drum 1030. The surface of the photoconductor drum 1030, from which the residual toner has been removed, is returned to the position that is opposed to the charging device 1031.

In the image forming apparatus according to the present invention, electrostatic latent images are formed by the charging device, the optical scanning device, which is an exposure device, the photoconductor, and the image processing section for converting an image pattern into optical output. That is, the charging device, the optical scanning device, the photoconductor, and the image processing section constitute an electrostatic latent-image forming apparatus according to the present embodiment.

The process for obtaining output images using an electrophotographic system of a copier, a laser printer, or the like, is as follows. With the electrophotographic system, a photoconductor, which is one of the latent-image bearers, is uniformly charged during a charging process, and the photoconductor is irradiated with light so that the electric charges are partially released during an exposure process. In this manner, with the electrophotographic system, electrostatic latent images may be formed on a photoconductor.

Configuration of the Optical Scanning Device

Next, an explanation is given of the configuration of the optical scanning device 1010 that is included in the image forming apparatus.

Figure 4:
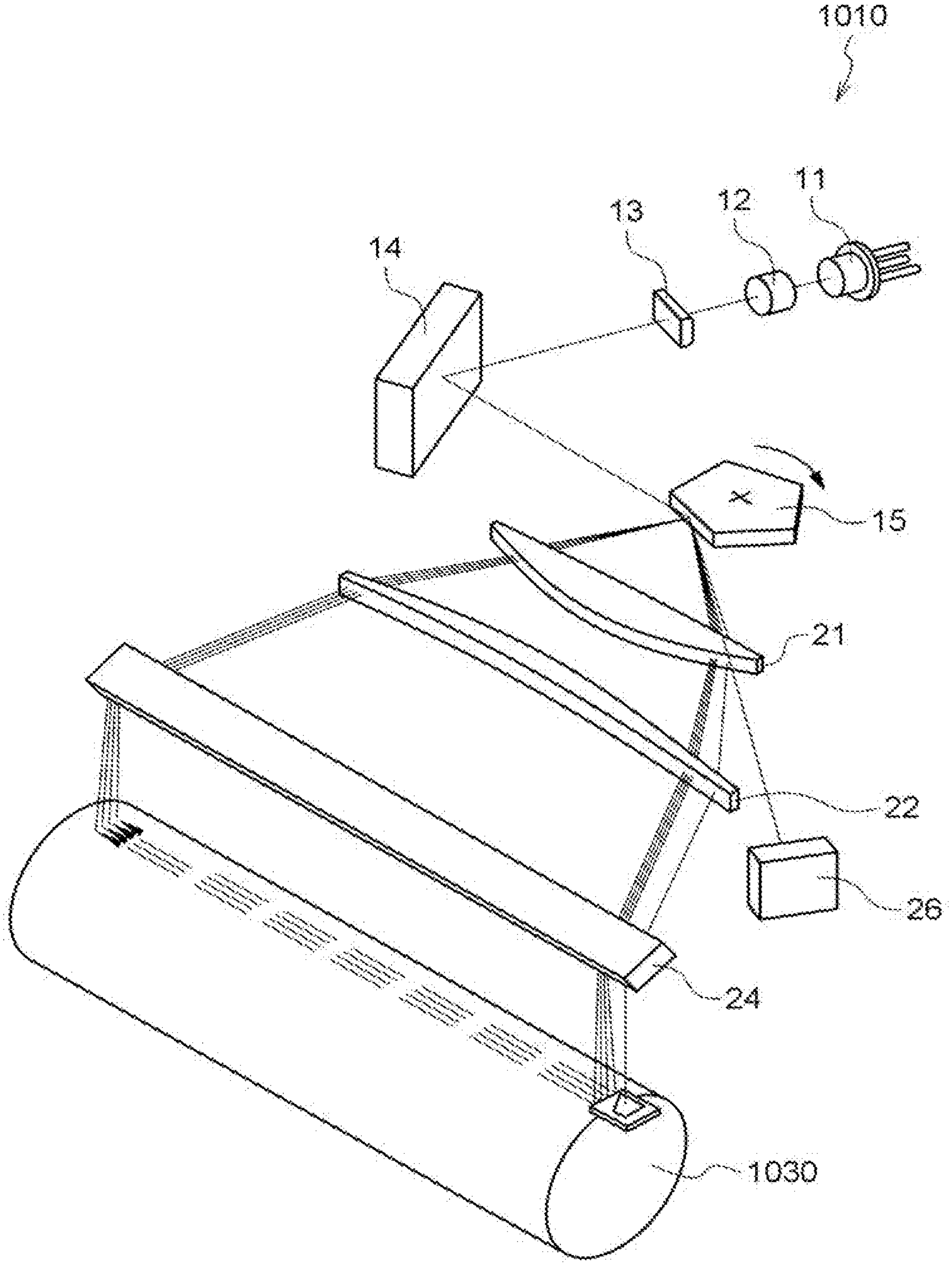
FIG. 4 is a schematic view that illustrates an example of an optical scanning device that is included in the above-described image forming apparatus.

As illustrated in FIG. 4, the optical scanning device 1010 includes a light source 11, a collimator lens 12, a cylindrical lens 13, a mirror 14, a polygon mirror 15, and a first scanning lens 21. Furthermore, the optical scanning device 1010 includes a second scanning lens 22, a mirror 24, a synchronization detection sensor 26, and a scanning control device. The optical scanning device 1010 is installed at a predetermined position of the optical housing.

Furthermore, in the following explanations, the direction along the longitudinal direction (the direction of the rotation axis) of the photoconductor drum 1030 is the direction of the axis Y in an XYZ three-dimensional orthogonal coordinate system, the direction along the rotation axis of the polygon mirror 15 is the direction of the axis Z, and the direction perpendicular to both the axis Y and the axis Z is the direction of the axis X.

In the following explanations, with respect to each optical member, the direction that corresponds to the main scanning direction is the main-scanning corresponding direction, and the direction that corresponds to the sub-scanning direction is the sub-scanning corresponding direction.

The light source 11 includes, for example, multiple light emitting units that are disposed in a two-dimensional array. The light emitting units are disposed such that, when all of the light emitting units are orthogonally projected on a virtual line that extends in the sub-scanning corresponding direction, the space between the light emitting units is equal. As the light source 11, it is possible to use a semiconductor laser (laser diode: LD), a light emitting diode (LED), or the like.

Figure 5:
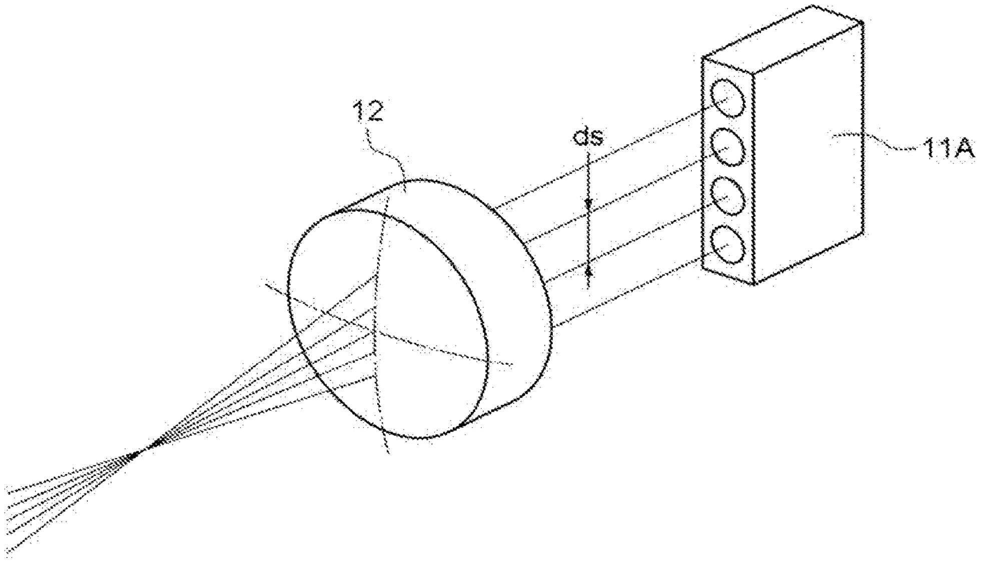
FIG. 5 is a schematic view that illustrates an example of a light source of the above-described optical scanning device.

In FIG. 5, a light source 11A of the optical scanning device 1010 is a semiconductor laser array that is configured such that four semiconductor lasers are disposed as a multibeam light source. Furthermore, the light source 11A is disposed perpendicular to the direction of the optical axis of the collimator lens 12.

Figure 6:
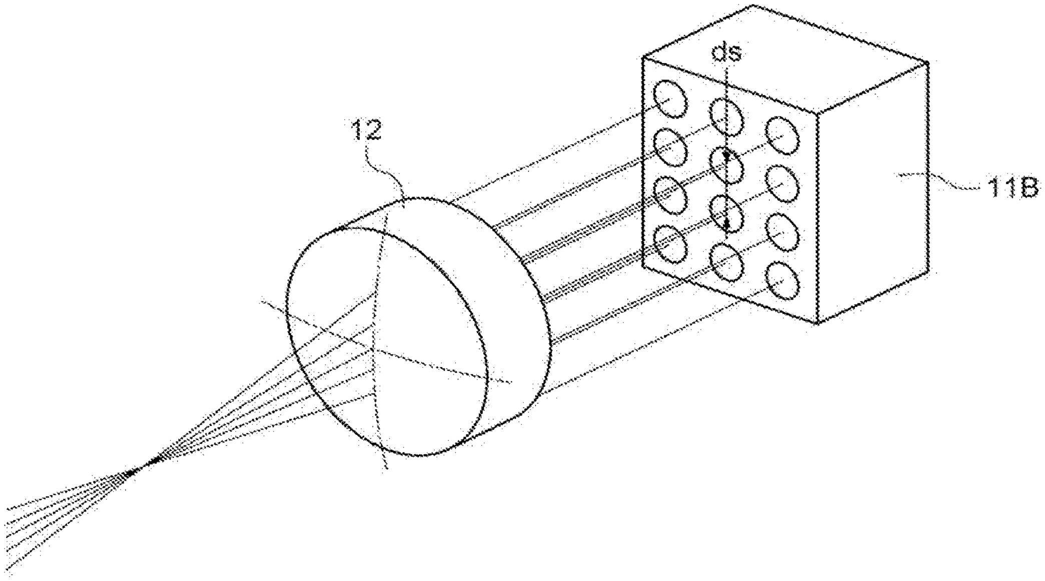
FIG. 6 is a schematic view that illustrates another example of the light source of the above-described optical scanning device.

In FIG. 6, a light source 11B, which is another example of the light source of the optical scanning device 1010, is a vertical-cavity surface-emitting laser (VCSEL) with the wavelength of for example 780 nm, where the light emitting points are disposed on the plain surface that includes the direction of the axis Y and the direction of the axis Z.

The light source 11B includes 12 light emitting points in total, for example, three in the main scanning direction, i.e., the direction of the axis Y, and four in the sub-scanning direction, i.e., the direction of the axis Z. If the light source 11B is applied to the optical scanning device 1010, a single scan line is scanned using the three light emitting points, disposed in a horizontal direction, whereby four scan lines in the vertical direction may also be simultaneously scanned. In the following explanations, the “space between the light emitting units” is the distance between the centers of two light emitting units.

With reference back to FIG. 4, the collimator lens 12 is disposed on the optical path of the light, emitted from the light source 11, so as to refract the light into a parallel light or an approximately parallel light.

The cylindrical lens 13 focuses the light, passed through the collimator lens 12, only in the sub-scanning direction in the vicinity of the deflection reflectance surface of the polygon mirror 15. The cylindrical lens 13 focuses the light, output from the light source 11, as an elongated line image in the main scanning direction (the direction of the axis Y) in the vicinity of the reflectance surface of the polygon mirror 15.

The mirror 14 reflects the light, which has been passed through the cylindrical lens 13 and focused, to the polygon mirror 15.

The optical system, which is disposed on the optical path between the light source 11 and the polygon mirror 15, is also referred to as a prior-deflector optical system.

The polygon mirror 15 is a multifaceted mirror that is rotated about the rotation axis that is perpendicular to the longitudinal direction of the photoconductor drum 1030. Each of the mirror surfaces of the polygon mirror 15 is a deflection reflectance surface. The polygon mirror 15 is rotated at a desired constant velocity when a driving integrated circuit (IC) gives an appropriate clock to a motor unit. When the polygon mirror 15 is rotated by the motor unit at a constant velocity in the direction of the arrow, multiple light beams, reflected by the deflection reflectance surface, are deflected at a constant angular velocity as deflection beams.

The first scanning lens 21, the second scanning lens 22, the mirror 24, and the synchronization detection sensor 26 constitute an optical scanning system. The optical scanning system is disposed on the optical path of the light that is deflected by the polygon mirror 15.

The first scanning lens 21 is disposed on the optical path of the light that is deflected by the polygon mirror 15.

The second scanning lens 22 is disposed on the optical path of the light that passes through the first scanning lens 21.

The mirror 24 is an elongated flat mirror, and bends the optical path of the light, passed through the second scanning lens 22, in a direction toward the photoconductor drum 1030.

The photoconductor drum 1030 is irradiated with the light that is deflected by the polygon mirror 15 and is passed through the first scanning lens 21 and the second scanning lens 22, whereby an optical spot is formed on the surface of the photoconductor drum 1030.

The optical spot on the surface of the photoconductor drum 1030 is moved in the longitudinal direction of the photoconductor drum 1030 in accordance with the rotation of the polygon mirror 15. The direction in which the optical spot on the surface of the photoconductor drum 1030 is moved is the main scanning direction, and the direction in which the photoconductor drum 1030 is rotated is the sub-scanning direction.

The synchronization detection sensor 26 receives light from the polygon mirror 15 and outputs, to the scanning control device, a photoelectric conversion signal that corresponds to the amount of received light. The signal output from the synchronization detection sensor 26 is also referred to as a synchronization detection signal.

As illustrated in FIG. 4, in the optical scanning device 1010, multiple lines on the scanned surface of the photoconductor drum 1030 are simultaneously scanned during scanning by the single deflection reflectance surface of the polygon mirror 15. A buffer memory in the image processing section, which controls light emission signals of each light emitting point, stores print data on one line that corresponds to each light emitting point.

The print data is read with regard to each deflection reflectance surface of the polygon mirror 15, and the light beam, which corresponds to the print data, is turned on/off on the scan line of the photoconductor drum 1030, which is a latent-image bearer, whereby an electrostatic latent image is formed in accordance with the scan line.

The Printer Control Device/the Scanning Control Device

Next, an explanation is given of the printer control device and the scanning control device of the image forming apparatus according to the present invention.

Figure 7:
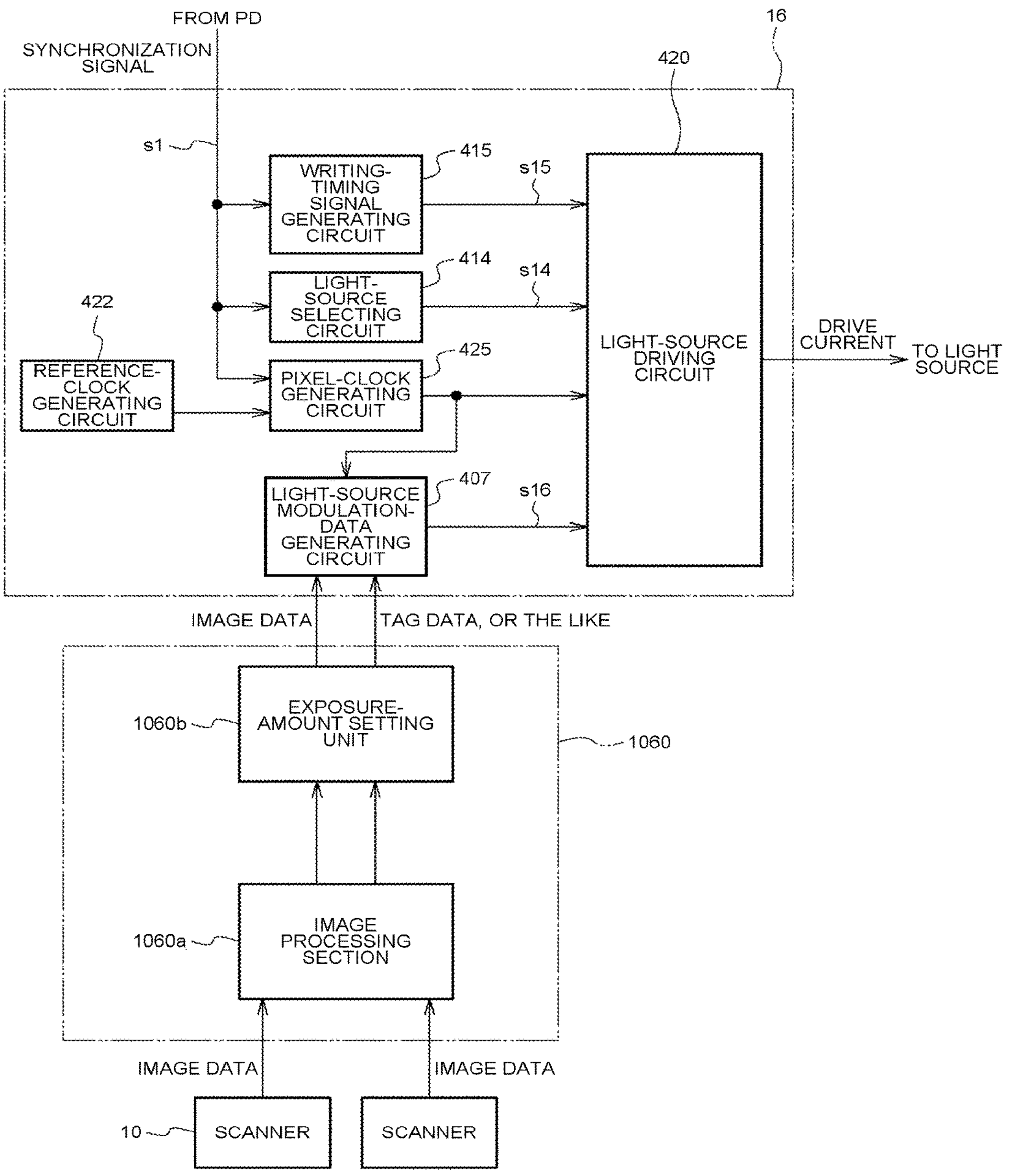
FIG. 7 is a block diagram that illustrates examples of a printer control device and a scanning control device that are included in the image forming apparatus of FIG. 1.

As illustrated in the block diagram that indicates the printer control device 1060 and the scanning control device 16 in FIG. 7, the printer control device 1060 includes a control unit that controls each component of the laser printer 1000 in an integrated manner; an image processing section 1060*a*; an exposure-amount setting unit 1060*b*; and the like.

The image processing section 1060*a* outputs image data, on which image processing has been performed as described later, tag data for identifying object information, or the like, to the exposure-amount setting unit 1060*b*.

The exposure-amount setting unit 1060*b* sets the exposure amount of each exposure pixel in the image data, on which image processing has been performed, from the image processing section 1060*a*, and outputs image data, tag data, and/or the like to the scanning control device 16 after the exposure amount has been set.

With regard to the image data that is sent from the image processing section 1060*a* to the exposure-amount setting unit 1060*b*, a white area (non-exposure pixel group) and a black area (exposed area) are specified on a pixel by pixel basis.

The exposure-amount setting unit 1060*b* is explained later in detail.

The scanning control device 16 scans the front surface of the photoconductor drum 1030 based on the image data, the tag data, or the like, from the exposure-amount setting unit 1060*b* after the exposure amount has been set, thereby forming an electrostatic latent image on the front surface of the photoconductor drum 1030.

The scanning control device 16 generates the driving information for the light source using the image data, the tag data, and/or the like from the exposure-amount setting unit 1060*b* depending on the need, and drives each light emitting unit of the light source using the driving information.

The scanning control device 16 includes a reference-clock generating circuit 422, a pixel-clock generating circuit 425, a light-source modulation-data generating circuit 407, a light-source selecting circuit 414, a writing-timing signal generating circuit 415, and a light-source driving circuit 420.

The arrow of FIG. 7 indicates the flow of a typical signal or information and does not indicate all of the connection relations of various blocks.

The reference-clock generation circuit 422 generates a high-frequency clock signal that is used as a reference in the light-source driving circuit 420.

The pixel-clock generating circuit 425 principally includes a phase locked loop (PLL) circuit. The pixel-clock generating circuit 425 generates a pixel clock signal based on a synchronization signal s1 and a high-frequency clock signal from the reference-clock generating circuit 422.

The pixel clock signal has the same frequency as the high-frequency clock signal, and has the same phase as the synchronization signal s1.

Therefore, the pixel-clock generating circuit 425 synchronizes image data with the pixel clock signal, thereby controlling the writing position for each scanning.

The generated pixel clock signal is fed to the light-source modulation-data generating circuit 407 as well as the light-source driving circuit 420 as one piece of driving information. The pixel clock signal, fed to the light-source modulation-data generating circuit 407, is used as a clock signal for write data s16.

The light-source modulation-data generating circuit 407 is equivalent to a light-source driving unit of the image forming apparatus according to the present invention. The light-source modulation-data generating circuit 407 generates the write data s16 for each light emitting unit based on the image information from an image processing unit (IPU), or the like. The write data s16 is fed as one piece of driving information to the light-source driving circuit 420 in timing for the pixel clock signal.

The light-source modulation-data generating circuit 407 converts image data into an exposure pattern using PM+PWM signals based on the image pattern information or the tag information from the image processing unit so as to form a latent image with the electrostatic latent-image forming method according to the present embodiment.

The light-source selecting circuit 414 is a circuit that is used if the light source includes multiple light emitting units, and selects a light emitting unit, which is used to detect the start of the subsequent scanning, from multiple light emitting units, e.g., 32, when the imaging plane of the scanning light reaches the end of the scanning, and outputs the signal that specifies the selected light emitting unit. An output signal s14 from the light-source selecting circuit 414 is fed as one piece of driving information to the light-source driving circuit 420. Furthermore, if the light source uses the single light emitting unit, the light-source selecting circuit 414 may not be disposed.

The writing-timing signal generating circuit 415 determines the timing for starting writing in accordance with the synchronization signal s1 and outputs an output signal s15, which is a signal for the timing, as one piece of the above-described driving information to the light-source driving circuit 420.

The light-source driving circuit 420 generates a drive current, e.g., a pulse current, of each light emitting unit of the light source based on the driving information, and supplies the drive current to the light emitting unit.

In the image forming apparatus 1000, exposure is conducted while changing the optical output value in relation to the position of the image area in the main scanning direction, i.e., in relation to the time after exposure on the image area is started. With the configuration that is illustrated in FIG. 7, the light-source driving circuit 420 simultaneously conducts pulse-width modulation (PWM) and light-intensity modulation (PM) so as to generate a light-source drive current.

The light-source driving circuit 420 is capable of converting a light-source modulation signal, which is obtained from light-source modulation data, into current; therefore, with the image forming apparatus 1000, it is possible to generate a PM+PWM signal with which the optical output and the lighting time may be controlled at the same time.

Figure 8:
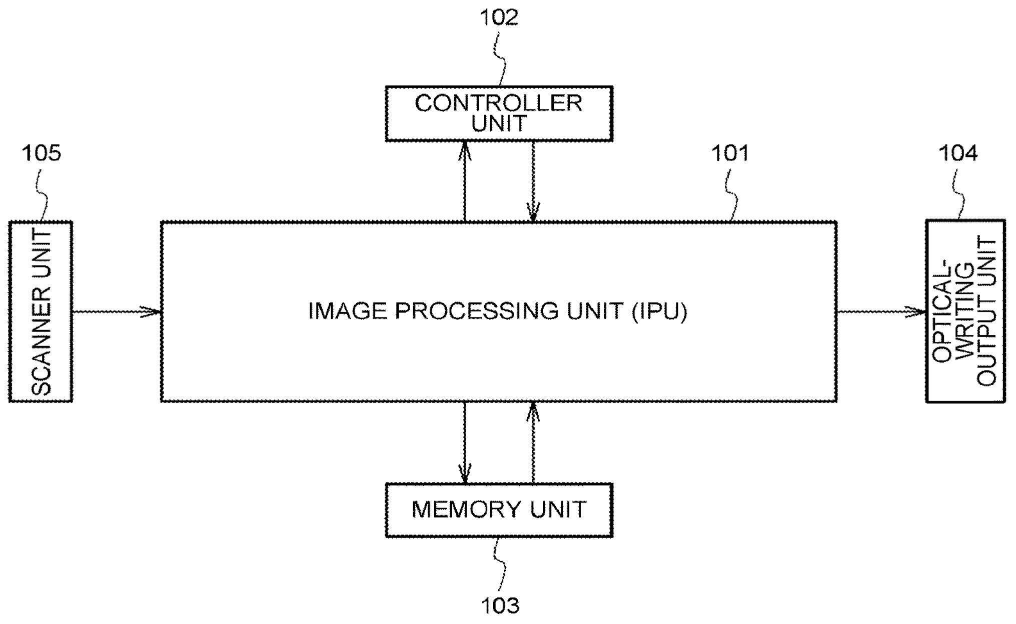
FIG. 8 is a block diagram that illustrates an image processing section of the above-described image forming apparatus.

As illustrated in the block diagram of FIG. 8, the image processing section includes an image processing unit 101, a controller unit 102, a memory unit 103, an optical-writing output unit 104, and a scanner unit 105.

Figure 9:
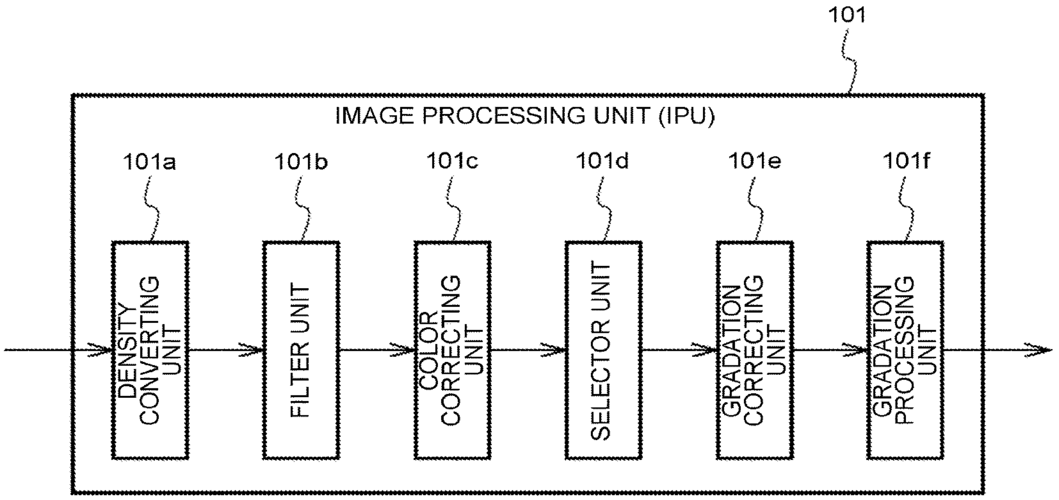
FIG. 9 is a block diagram that illustrates an image processing unit of the above-described image processing section.

As illustrated in the block diagram of FIG. 9, the image processing unit 101 includes a density converting unit 101*a*, a filter unit 101*b*, a color correcting unit 101*c*, a selector unit 101*d*, a gradation correcting unit 101*e*, and a gradation processing unit 101*f*.

The density converting unit 101*a* converts RGB image data from the scanner unit 105 into density data using a look-up table and outputs the density data to the filter unit 101*b*.

The filter unit 101*b* performs image correction processing, such as smoothing processing or edge enhancement processing, on the density data input from the density converting unit 101*a*, and outputs the density data subjected to the image correction processing, to the color correcting unit 101*c*.

The color correcting unit 101*c* performs color correction, i.e., masking processing.

The selector unit 101*d* selects any one of cyan (C), magenta (M), yellow (Y), and key plate (K) with regard to the image data that is input from the color correcting unit 101*c* under the control of the image processing unit 101. The selector unit 101*d* outputs the selected data on C, Y, M, or K to the gradation correcting unit 101*e*.

The gradation correcting unit 101*e* previously stores data on C, M, Y, and K, input from the selector unit 101*d*. To the gradation correcting unit 101*e*, the γ curve is set to obtain the linear characteristics for the input data.

The gradation processing unit 101*f* performs gradation processing, such as dither processing, on the image data that is input from the gradation correcting unit 101*e*, and outputs the signal to the optical-writing output unit 104.

With reference back to FIG. 8, the controller unit 102 performs processing, such as rotation, repeating, combining, or compressing/expanding, on image data and then outputs the processed image data to the IPU again.

In the memory unit 103, look-up tables are prepared to store various types of data.

The optical-writing output unit 104 conducts optical modulation of the light source 11 in accordance with the lighting data using a control driver, thereby forming an electrostatic latent image on the photoconductor drum 1030. The optical-writing output unit 104 forms an electrostatic latent image based on an input signal from the gradation processing unit that is described later. As for the formed electrostatic latent image, an image is formed on a recording sheet by the above-described developing device 1032, the transfer device 1033, or the like.

The scanner unit 105 reads an image and generates image data, such as red, green, blue (RGB) data, based on the image.

Furthermore, the image processing unit 101 outputs the image data on which image processing has not been performed, or the image data on which image processing has been performed, i.e., the density data, to the controller unit 102 if needed.

Configuration of an Electrostatic Latent-Image Measurement Device

Next, an explanation is given of the configuration of an electrostatic latent-image measurement device with which the state of an electrostatic latent image, formed using the electrostatic latent-image forming method according to the present embodiment, may be checked.

Figure 10:
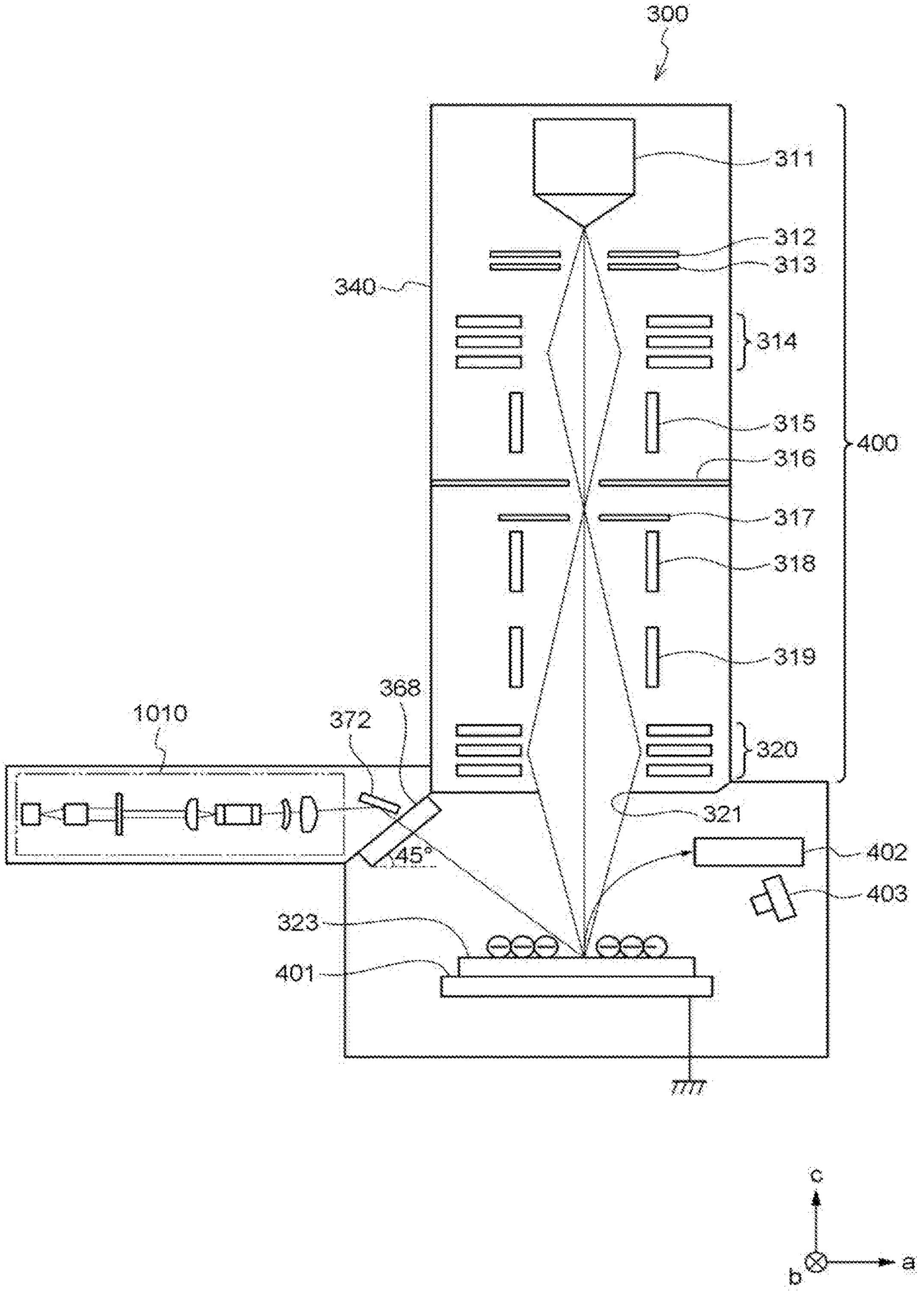
FIG. 10 is a central cross-sectional view that illustrates an example of an electrostatic latent-image measurement device.

In FIG. 10, an electrostatic latent-image measurement device 300 includes a charged-particle irradiation system 400, the optical scanning device 1010, a specimen stage 401, a detector 402, an LED 403, a control system, a discharge system, a driving power source, or the like.

The charged-particle irradiation system 400 is disposed within a vacuum chamber 340. The charged-particle irradiation system 400 includes an electron gun 311, an extraction electrode 312, an acceleration electrode 313, a condenser lens 314, a beam blanker 315, and a partition plate 316. Furthermore, the charged-particle irradiation system 400 includes a movable aperture 317, a stigmator 318, a scanning lens 319, and an objective lens 320.

In the following explanation, the traveling direction of the light beam of the electron gun 311 is the direction of the axis c, and the two directions that run at right angles to each other on the plane that is perpendicular to the direction of the axis c are the directions of the axis a and the axis b.

The electron gun 311 generates an electron beam that is a charged-particle beam. In the following explanation, the travelling direction of the electron beam of the electron gun 311 is the +c-axis direction.

The extraction electrode 312 is disposed in the +c-axis direction to the electron gun 311, and controls the electron beam that is generated by the electron gun 311.

The acceleration electrode 313 is disposed in the +c-axis direction to the extraction electrode 312, and controls the energy of the electron beam.

The condenser lens 314 is disposed in the +c-axis direction to the acceleration electrode 313, and converges the electron beam.

The beam blanker 315 is disposed in the +c-axis direction to the condenser lens 314, and turns on/off the irradiation of the electron beam.

The partition plate 316 is disposed in the +c-axis direction to the beam blanker 315, and has an opening at the center thereof.

The movable aperture 317 is disposed in the +c-axis direction to the partition plate 316, and adjusts the beam diameter of the electron beam that passes through the opening of the partition plate 316.

The stigmator 318 is disposed in the +c-axis direction to the movable aperture 317, and corrects astigmatism.

The scanning lens 319 is disposed in the +c-axis direction to the stigmator 318, and deflects the electron beam that passes through the stigmator 318 within the plane ab.

The objective lens 320 is disposed in the +c-axis direction to the scanning lens 319, and converges the electron beam that passes through the scanning lens 319. The electron beam that passes through the objective lens 320 is passed through a beam emission opening 321 so that the surface of a specimen 323 is irradiated with the electron beam. The driving power source is connected to each lens, or the like.

Furthermore, the charged particle means a particle that is affected by an electric field or a magnetic field. As the beam for irradiating charged particles, for example, an ion beam may be used instead of the electron beam. In this case, a liquid metal ion gun, or the like, is used instead of the electron gun.

The specimen 323 is a photoconductor and includes a conductive support, a charge generation layer (CGL), and a charge transport layer (CTL).

The charge generation layer includes a charge generation material (CGM), and is formed on the surface of the conductive support on the −c-axis side. The charge transport layer is formed on the surface of the charge generation layer on the −c-axis side.

When the specimen 323 is exposed in a state where the surface, i.e., the surface on the −c side, is electrically charged, the light is absorbed by the charge generation material in the charge generation layer, and charge carriers that have two polarities, i.e., positive and negative, are generated. Due to the electric field, one of the carriers moves to the charge transport layer, and the other one moves to the conductive support.

The carrier that enters the charge transport layer is moved to the surface of the charge transport layer due to the electric field, is combined with the charge on the surface, and is vanished. Thus, a charge distribution, i.e., an electrostatic latent image, is formed on the surface (the surface on the −c side) of the specimen 323.

The optical scanning device 1010 includes a light source, a coupling lens, an apertured plate, a cylindrical lens, a polygon mirror, an optical scanning system, or the like. Furthermore, the optical scanning device 1010 includes a scanning mechanism for optical scanning with respect to the direction parallel to the rotation axis of the polygon mirror.

The light is emitted by the optical scanning device 1010 and is incident on a reflection mirror 372 and a window glass 368 so that the surface of the specimen 323 is irradiated with the light.

Due to deflection of the polygon mirror and deflection of the scanning mechanism, the irradiation location of the light, emitted by the optical scanning device 1010, on the surface of the specimen 323 is changed in the two directions that run at right angles to each other on the plane that is perpendicular to the direction of the axis c. Here, the direction in which the irradiation location is changed due to deflection of the polygon mirror is the main scanning direction, and the direction in which the irradiation location is changed due to deflection of the scanning mechanism is the sub-scanning direction. Here, the settings are specified such that the direction of the axis a is the main scanning direction, and the direction of the axis b is the sub-scanning direction.

Thus, with the electrostatic latent-image measurement device 300, it is possible to perform two-dimensional scanning on the surface of the specimen 323 using the light that is emitted by the optical scanning device 1010. The electrostatic latent-image measurement device 300 is capable of forming a two-dimensional electrostatic latent image on the surface of the specimen 323.

The optical scanning device 1010 is disposed outside the vacuum chamber 340 so as not to give effects to the trajectory of the electron beam due to the vibration or electromagnetic wave that is generated by a drive motor of the polygon mirror. Thus, it is possible to prevent any effects of disturbance to measurement results.

The detector 402 is disposed near the specimen 323, and detects secondary electrons from the specimen 323.

The LED 403 is disposed near the specimen 323, and emits light for lighting the specimen 323. The LED 403 is used to remove the charge that remains on the surface of the specimen 323 after measurement.

The optical housing, which supports the optical scanning system, may cover the entire optical scanning system to block outside light that enters the inside of the vacuum chamber.

In the optical scanning system, the scanning lens has the fθ characteristics, and is configured such that, when the optical deflector is rotated at the constant speed, the light beam is moved at approximately the constant speed with respect to the imaging plane. Furthermore, the optical scanning system has a configuration such that the beam spot diameter may be approximately the same during scanning.

In the electrostatic latent-image measurement device 300, as the optical scanning system is disposed apart from the vacuum chamber, there are few effects of direct propagation of the vibration, which occurs when an optical deflector, such as a polygon scanner, is driven, to the vacuum chamber 340.

It is possible to achieve further improved vibration absorption effect by disposing a vibration absorbing unit, such as a damper, in the structure that supports the optical scanning system.

By disposing the optical scanning system, the electrostatic latent-image measurement device 300 is capable of forming any latent image patterns, including a line pattern, in the direction of the generatrix of the photoconductor.

To form a latent image pattern at a predetermined position, the synchronization detection sensor 26 may be disposed to detect a scanning beam from an optical deflecting unit. The shape of the specimen may be flat or curved.

Figure 11:
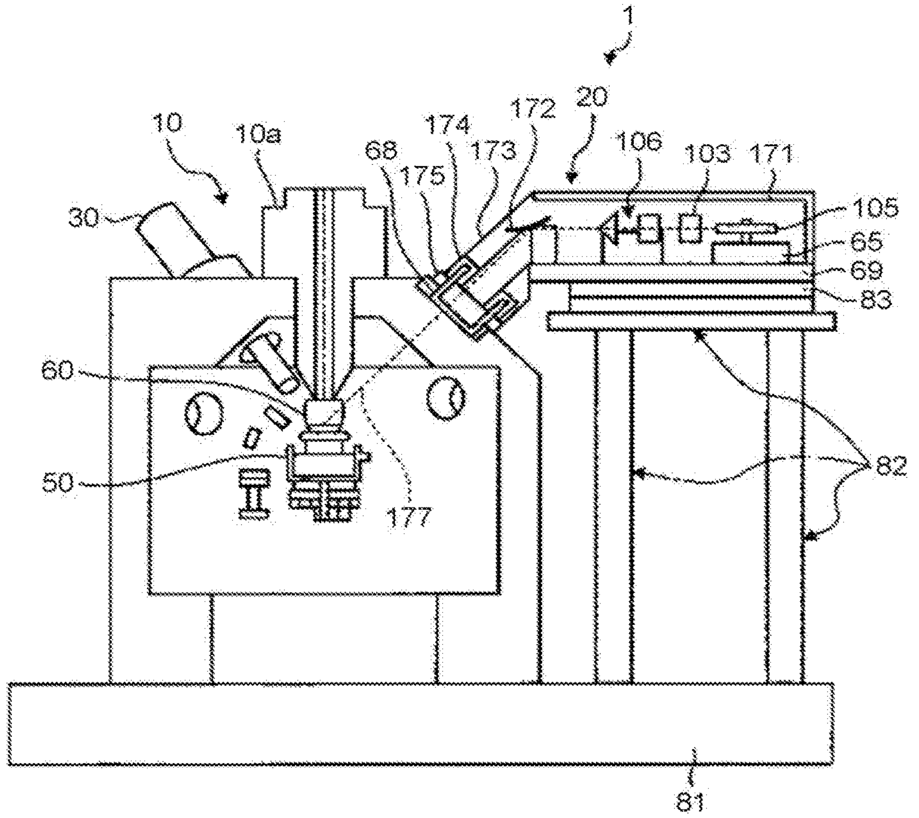
FIG. 11 is a central cross-sectional view that illustrates an example of a vacuum chamber of the above-described electrostatic latent-image measurement device.

As illustrated in FIG. 11, a vacuum chamber 1 is disposed with a glass window 172 in the position at 45° relative to the vertical axis so that light from the light source enters the inside of the vacuum chamber 1 from outside. An optical scanning device 171 that has the same configuration as the optical scanning device 1010 is disposed outside the vacuum chamber 1.

The optical scanning device 171 includes a light source, a polygon mirror as an optical deflector, a scanning lens, a synchronization detecting unit, or the like. The optical housing, which supports the optical scanning device 171, may cover the entire optical scanning device 171 so as to block outside light (harmful light) that enters the inside of the vacuum chamber.

Method of Measuring Electrostatic Latent Images

Next, an explanation is given of the method of measuring electrostatic latent images.

In the electrostatic latent-image measurement device 300, the specimen 323, which is a photoconductor, is irradiated with an electron beam to measure an electrostatic latent image.

Figure 12:
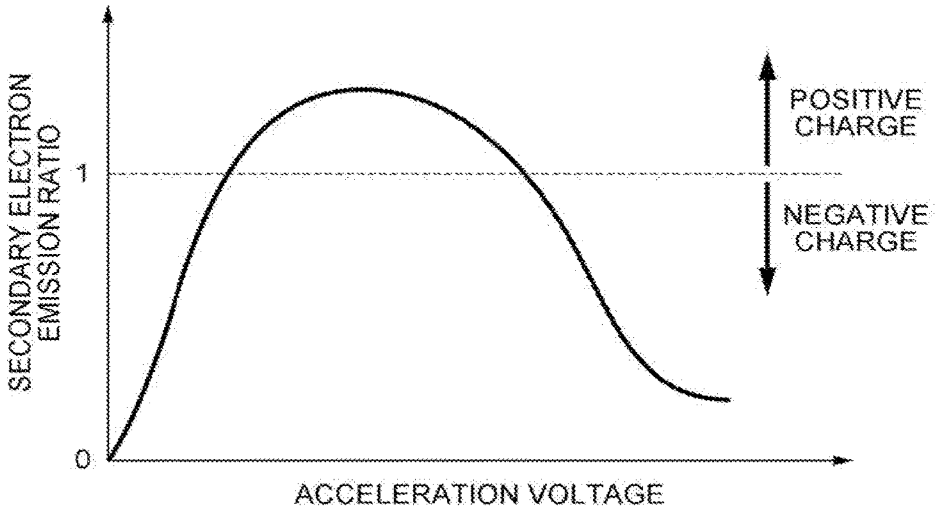
FIG. 12 is a schematic graph that illustrates the relationship between the acceleration voltage and the charge.

As illustrated in FIG. 12, in the electrostatic latent-image measurement device 300, an acceleration voltage |Vacc|, which is the voltage applied to the acceleration electrode 313, is set to be a voltage higher than the voltage with which the secondary electron emission ratio of the specimen 323 is 1. As the acceleration voltage is set as described above, the number of incident electrons in the specimen 323 exceeds the number of ejected electrons; therefore, the electrons are accumulated in the specimen 323 and charge-up occurs. As a result, in the electrostatic latent-image measurement device 300, the surface of the specimen 323 may be uniformly negatively charged.

Figure 13:
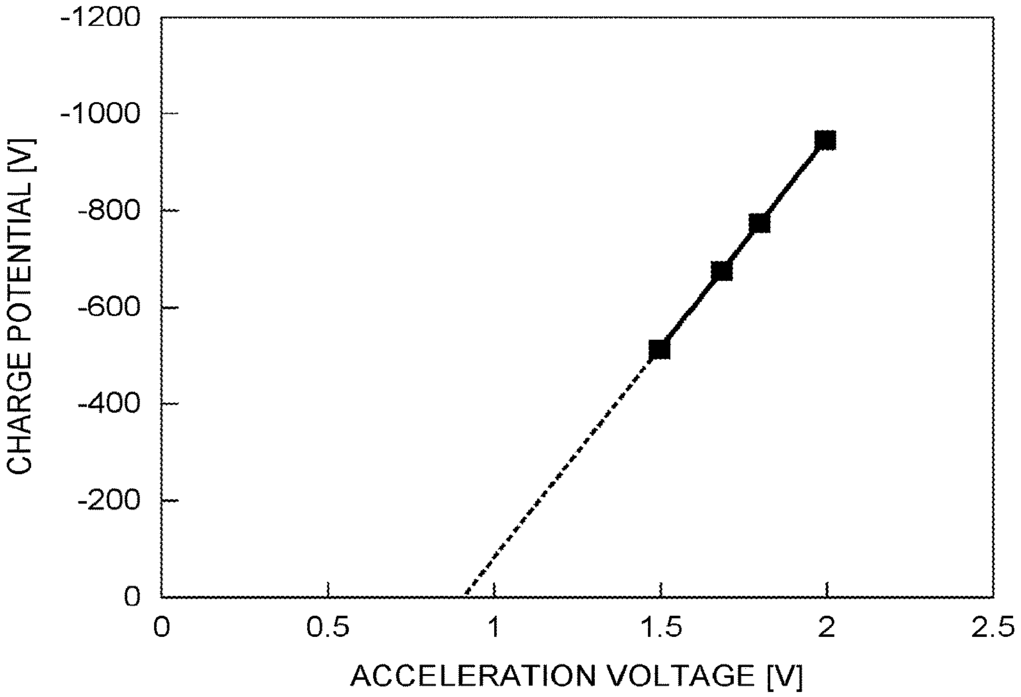
FIG. 13 is a graph that illustrates the relationship between the acceleration voltage and the charge potential.

As illustrated in FIG. 13, the acceleration voltage and the charge potential have a certain relationship. Therefore, in the electrostatic latent-image measurement device 300, by appropriately setting the acceleration voltage and the irradiation time, it is possible to form a charge potential on the surface of the specimen 323 in the same manner as on the photoconductor drum 1030 in the image forming apparatus 1000.

Furthermore, it is possible to obtain a target charge potential in a shorter time if the irradiation current is higher; therefore, the irradiation current is here set to a few nA.

Afterward, in the electrostatic latent-image measurement device 300, in order to observe an electrostatic latent image, the number of incident electrons in the specimen 323 is set in the range from a hundredth part to a thousandth part.

In the electrostatic latent-image measurement device 300, the optical scanning device 1010 is controlled so that two-dimensional optical scanning is performed on the surface of the specimen 323 and an electrostatic latent image is formed on the specimen 323. Furthermore, the optical scanning device 1010 is adjusted such that an optical spot with a desired beam diameter and beam profile is formed on the surface of the specimen 323.

The exposure energy, which is needed to form an electrostatic latent image, is determined in accordance with the sensitivity characteristics of a specimen, usually about 2 to 10 $mJ/m^2$. If a specimen has low sensitivity, the needed exposure energy is sometimes equal to or more than 10 $mJ/m^2$. That is, the charge potential and the needed exposure energy are set in accordance with the sensitivity characteristics of a specimen or process conditions. The exposure condition of the electrostatic latent-image measurement device 300 is set to be the same as the exposure condition that conforms to the image forming apparatus 1000.

Therefore, in such a case, the circumstance of a static electric field or the trajectory of an electron is calculated in advance, and a detection result is corrected in accordance with the result of a calculation; thus, the profile of an electrostatic latent image may be obtained with a high accuracy.

Figure 14:
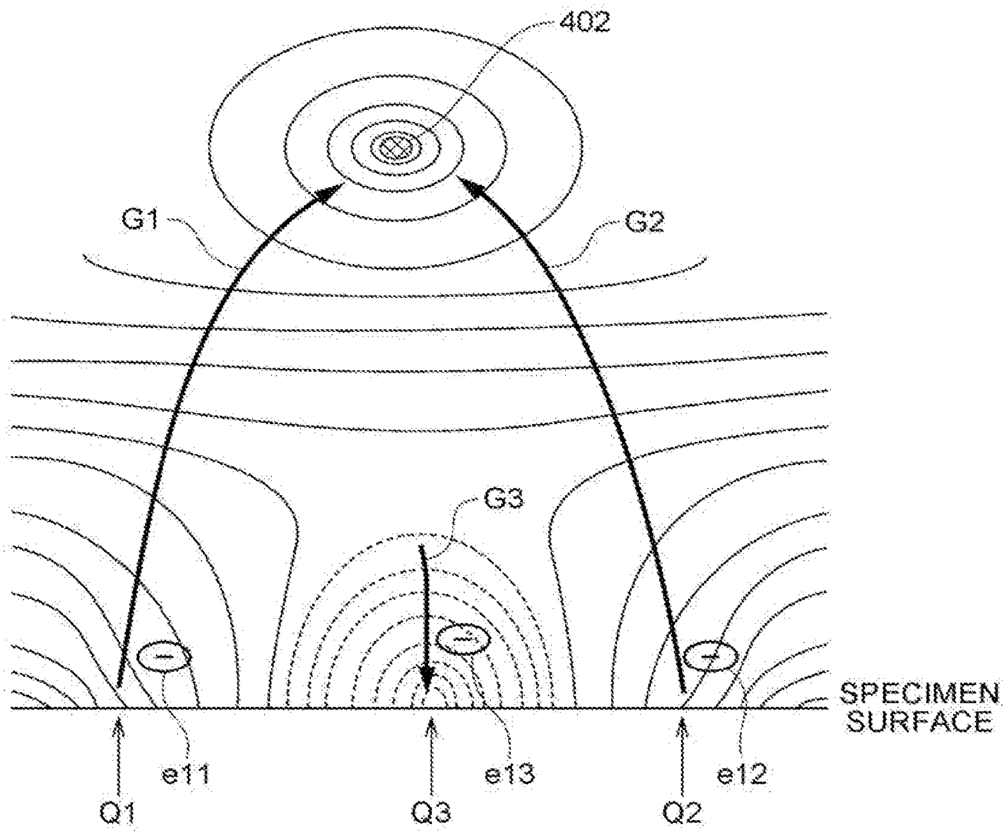
FIG. 14 is a schematic view that illustrates the potential distribution due to secondary electrons on the surface of a specimen.

FIG. 14 is an explanatory diagram of a detector 402, which captures charged particles, and the electric potential distribution in the space between the detector 402 and the specimen 323 using contour lines. The surface of the specimen 323 is uniformly negatively charged except for the area where the electric potential is decreased due to light descreasing, and a positive electric potential is applied to the detector 402. Therefore, in the group of potential contour lines that are indicated by the solid line, the higher the electric potential is, the closer to the detector 402 and the further from the surface of the specimen 323 the position is.

Therefore, after secondary electrons ell and ell are generated at points Q1 and Q2, which are the uniformly negatively charged areas, the secondary electrons ell and ell are attracted by the positive electric potential of the detector 402, are shifted as indicated by the arrows G1 and G2, and are captured by the detector 402.

Furthermore, a point Q3 is the area to which light is emitted and the negative electric potential is decreased, and the arrangement of the potential contour lines in the vicinity of the point Q3 is a semi-circular wave shape that is expanded with the point Q3 at the center, as indicated by the dashed line. In this wavelike electric potential distribution, the higher the electric potential is, the closer to the point Q3 the position is.

In other words, an electric force acts on a secondary electron el3, which is generated in the vicinity of the point Q3, so as to restrain the secondary electron el3 close to the specimen 323, as indicated by an arrow G3. Thus, the secondary electron el3 is captured within the hole of the potential, indicated by the dashed potential contour line, and is unmovable toward the detector 402.

Figure 15:
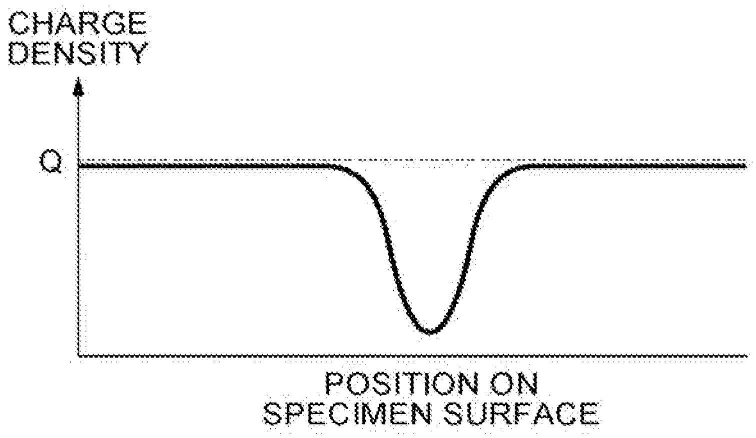
FIG. 15 is a schematic graph that illustrates the charge distribution due to secondary electrons on the surface of a specimen.

FIG. 15 schematically illustrates the hole of the potential. The area whose intensity of secondary electrons (number of secondary electrons), detected by the detector 402, is high corresponds to the blank area of the electrostatic latent image, i.e., the uniformly negatively charged area, typically, the areas of the points Q1 and Q2 in FIG. 14. The area whose intensity of secondary electrons, i.e., number of secondary electrons, detected by the detector 402, is low corresponds to the image area of the electrostatic latent image, i.e., the area that is irradiated with light, typically, the area of the point Q3 in FIG. 14.

Therefore, if the electric signal, obtained from an output of the detector 402, is sampled in an appropriate sampling time, a sampling time T is used as a parameter, and a surface potential distribution (a potential contrast image) V(a, b) may be determined for each micro region that corresponds to the sampling.

Furthermore, if the surface potential distribution V(a, b) is configured as two-dimensional image data and is displayed on a display device, or is printed by a printer, an electrostatic latent image may be obtained as a visible image.

With regard to an electrostatic latent image, for example, if the intensity of the captured secondary electron is "represented using the brightness level", the contrast is obtained such that the image area of the electrostatic latent image is dark and the blank area thereof is bright, and the brightness image corresponding to the surface charge distribution may be represented, i.e., output. Moreover, if the surface potential distribution may be determined with regard to an electrostatic latent image, the surface charge distribution may also be determined.

Furthermore, by obtaining the profile of the surface charge distribution or the surface potential distribution with regard to an electrostatic latent image, it is possible to measure the electrostatic latent image with a higher accuracy.

Figure 16:
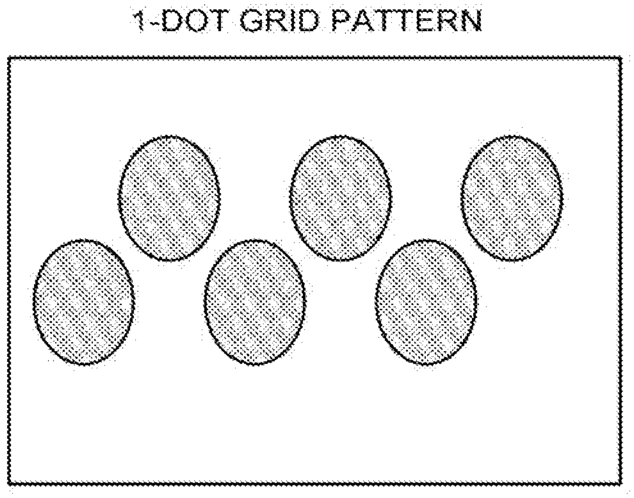
FIG. 16 is a schematic view that illustrates an example of a latent image pattern by the optical scanning device of FIG. 4.

As illustrated in FIG. 16, latent image patterns by the optical scanning device include, what are called, a one-dot isolated pattern or a 1-dot grid pattern.

Figure 17:
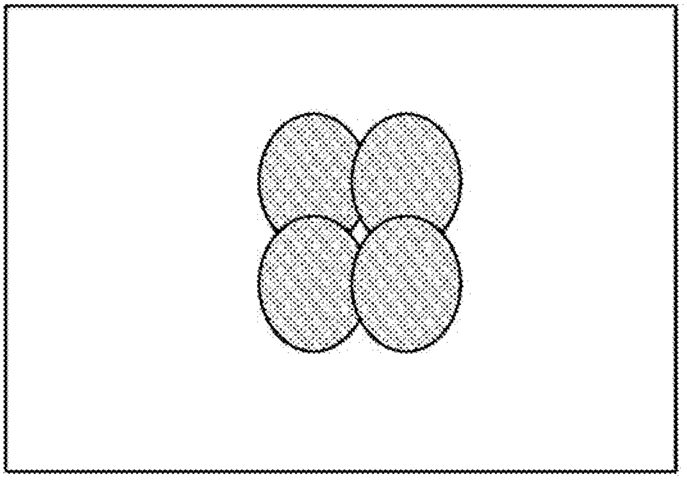
FIG. 17 is a schematic view that illustrates another example of the latent image pattern by the optical scanning device of FIG. 4.

As illustrated in FIG. 17, latent image patterns by the optical scanning device include, what is called, a 2-dot isolated pattern.

Figure 18:
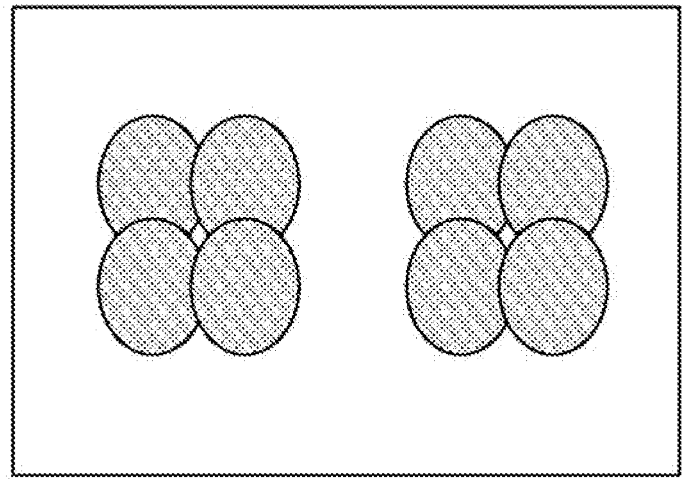
FIG. 18 is a schematic view that illustrates further another example of the latent image pattern by the optical scanning device of FIG. 4.

As illustrated in FIG. 18, latent image patterns by the optical scanning device include, what is called, a 2-by-2 pattern.

Figure 19:
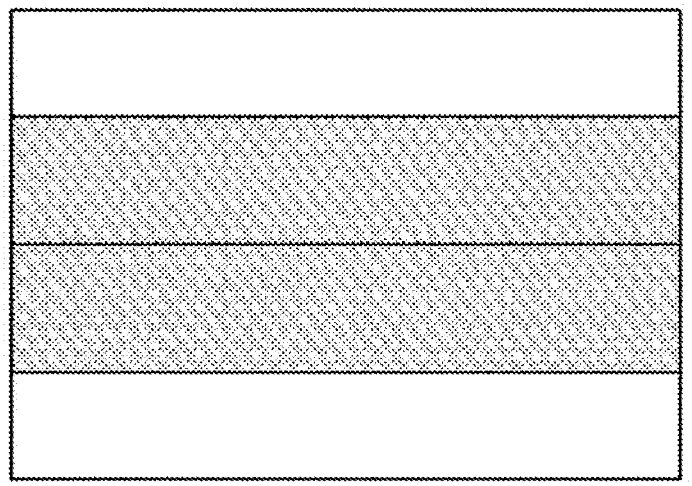
FIG. 19 is a schematic view that illustrates further another example of the latent image pattern by the optical scanning device of FIG. 4.

As illustrated in FIG. 19, latent image patterns by the optical scanning device include, what is called, a 2-dot line pattern.

Furthermore, latent image patterns by the optical scanning device are not limited to the above, and various patterns may be formed.

The object that is detected by the detector 402 is not limited to secondary electrons from the specimen 323. For example, the detector 402 may detect an electron that acts repulsively (hereafter, also referred to as a "primary repulsive electron") in the vicinity of the surface of the specimen 323 before an incident electron beam reaches the surface of the specimen 323.

Figure 20:
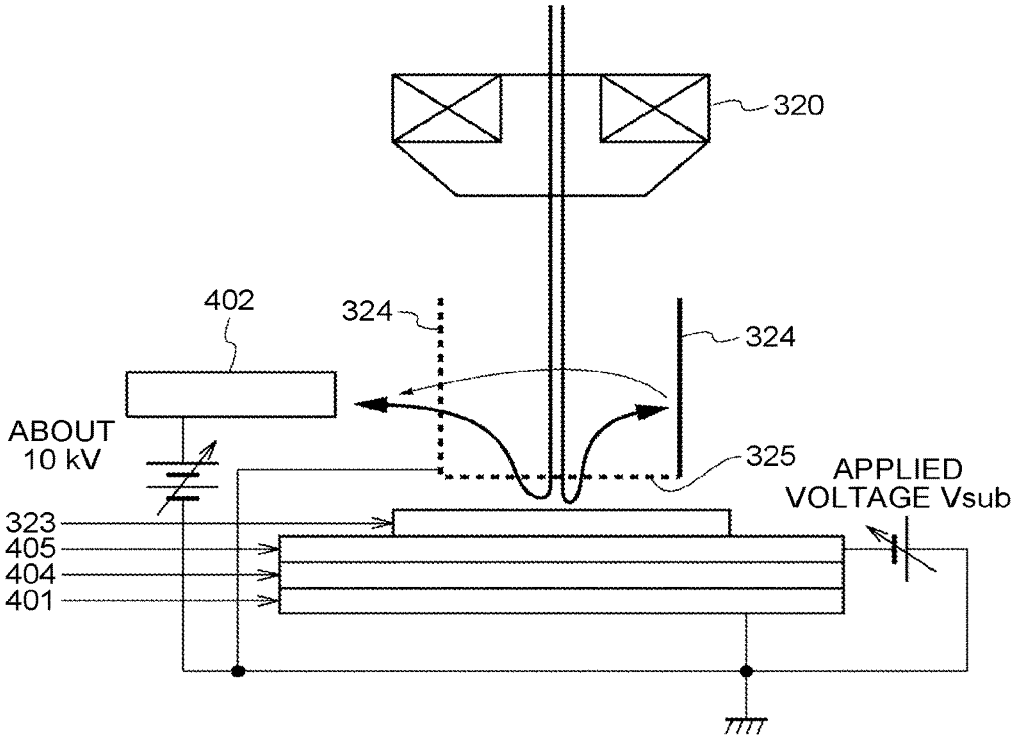
FIG. 20 is a central cross-sectional view that illustrates an example of the measurement using a grid-mesh arrangement.

As illustrated in FIG. 20, in the example of the measurement using a grid-mesh arrangement, an insulating member 404 and a conductive member 405 are disposed between a specimen stage 401 and the specimen 323, and the voltage of ±Vsub is applied to the conductive member 405.

The conductive member 405 under the specimen 323 is connected to a voltage applying unit that is capable of applying the voltage of ±Vsub. Furthermore, a grid mesh 325 is disposed above the specimen 323 to prevent an incident electron beam from being affected by the specimen electric charge. With the above-described configuration, the detector 402 detects primary repulsive electrons.

A conductive plate 324 or a side grid facing the detector 402 may be disposed on the detector 402.

An acceleration voltage is usually represented as being positive; however, as Vacc is negative, the acceleration voltage is represented as being negative (Vacc<0). Furthermore, the electric potential of the specimen 323 is Vp (<0).

As an electric potential is an electric potential energy per unit charge, an incident electron moves at a velocity that corresponds to the acceleration voltage Vacc if the electric potential is 0 (V). Specifically, when the amount of electric charge of an electron is e and the mass of the electron is m, the initial velocity v0 of the electron is represented by mv02/2=e×|Vacc|. Here, in the vacuum, in accordance with the law of conservation of energy, an electron moves at the constant velocity at the area where the acceleration voltage is not applied.

The higher the electric potential is, the closer to the specimen 323 the position is. An electron is affected by the Coulomb's repulsion due to the electric charge of the specimen 323 and thus the velocity of the electron decreases. Therefore, the following phenomena are generally caused.

Figure 21:
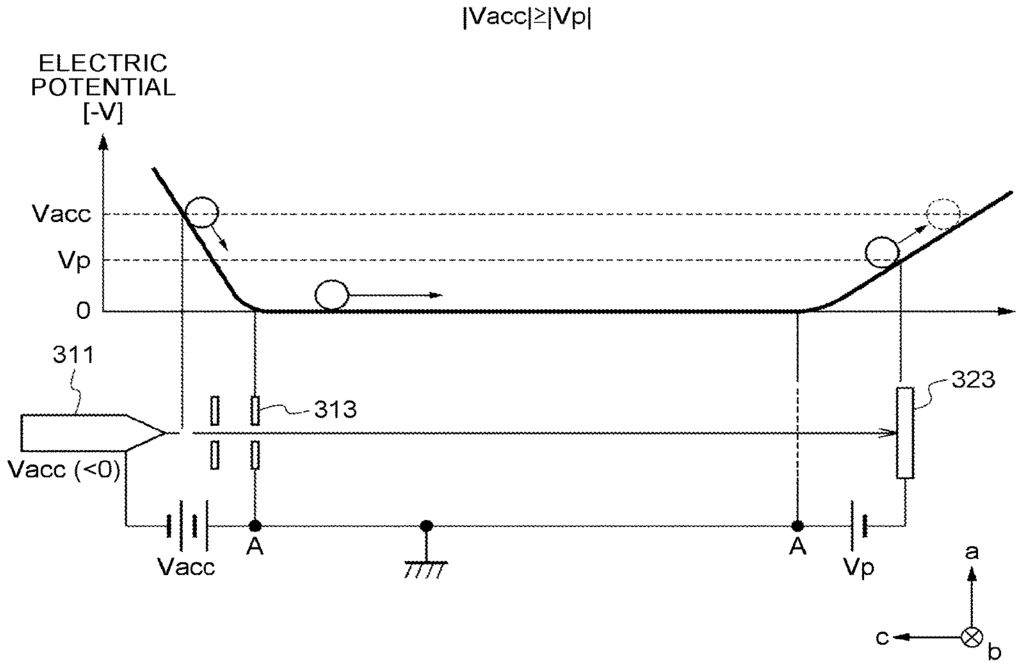
FIG. 21 is a schematic diagram that illustrates the behavior of an incident electron when $|vacc| \geq |Vp|$.

As illustrated in FIG. 21, when |Vacc|≥|Vp|, an incident electron reaches the specimen 323 although the velocity of the incident electron decreases.

Figure 22:
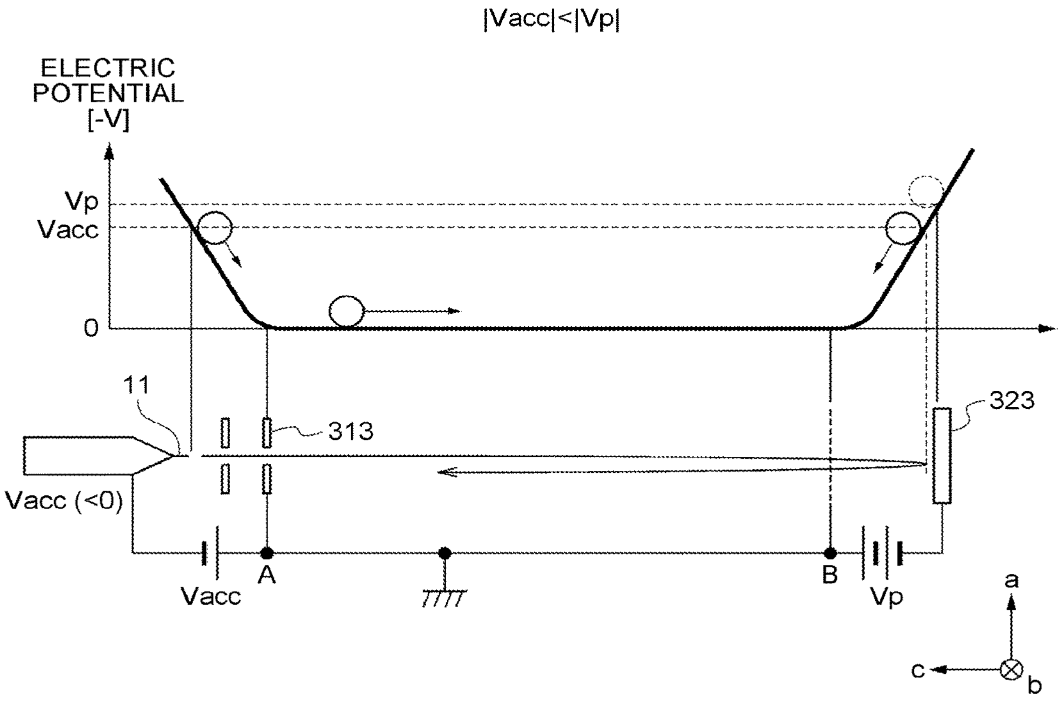
FIG. 22 is a schematic diagram that illustrates the behavior of an incident electron when $|Vacc| < |Vp|$.

As illustrated in FIG. 22, when |Vacc|<|Vp|, the velocity of an incident electron gradually decreases due to an effect of the electric potential of the specimen 323, the velocity becomes zero before the incident electron reaches the specimen 323, and the incident electron moves in an opposite direction.

In the vacuum where there is no air resistance, the law of conservation of energy almost comes into effect. Therefore, the condition in which the energy, i.e., the landing energy, on the surface of the specimen 323 becomes nearly zero when the energy of the incident electron is changed may be measured to measure the electric potential on the surface of the specimen 323.

Between the secondary electrons and the primary repulsive electrons generated when incident electrons reach the specimen 323, the number of electrons that reach the detector 402 is significantly different; therefore, the secondary electrons and the primary repulsive electrons can be distinguished base on the boundary of a light-dark contrast.

Scanning electron microscopes, or the like, include a detector for reflected electrons and, in this case, the reflected electrons usually mean electrons that are ejected from the surface of a specimen when incident electrons are reflected (scattered) by the back surface due to the mutual effect with the material of the specimen.

The energy of a reflected electron is equivalent to the energy of an incident electron. It is said that the velocity vector of a reflected electron is larger as the atomic number of a specimen is larger. Furthermore, reflected electrons are used to detect the difference in the composition of a specimen, the concavity and convexity on the surface, or the like.

Conversely, primary repulsive electrons mean electrons that are affected by an electric potential distribution on the surface of a specimen and are reversed before reaching the surface of the specimen, and the primary repulsive electrons are entirely different from reflected electrons.

Figure 23:
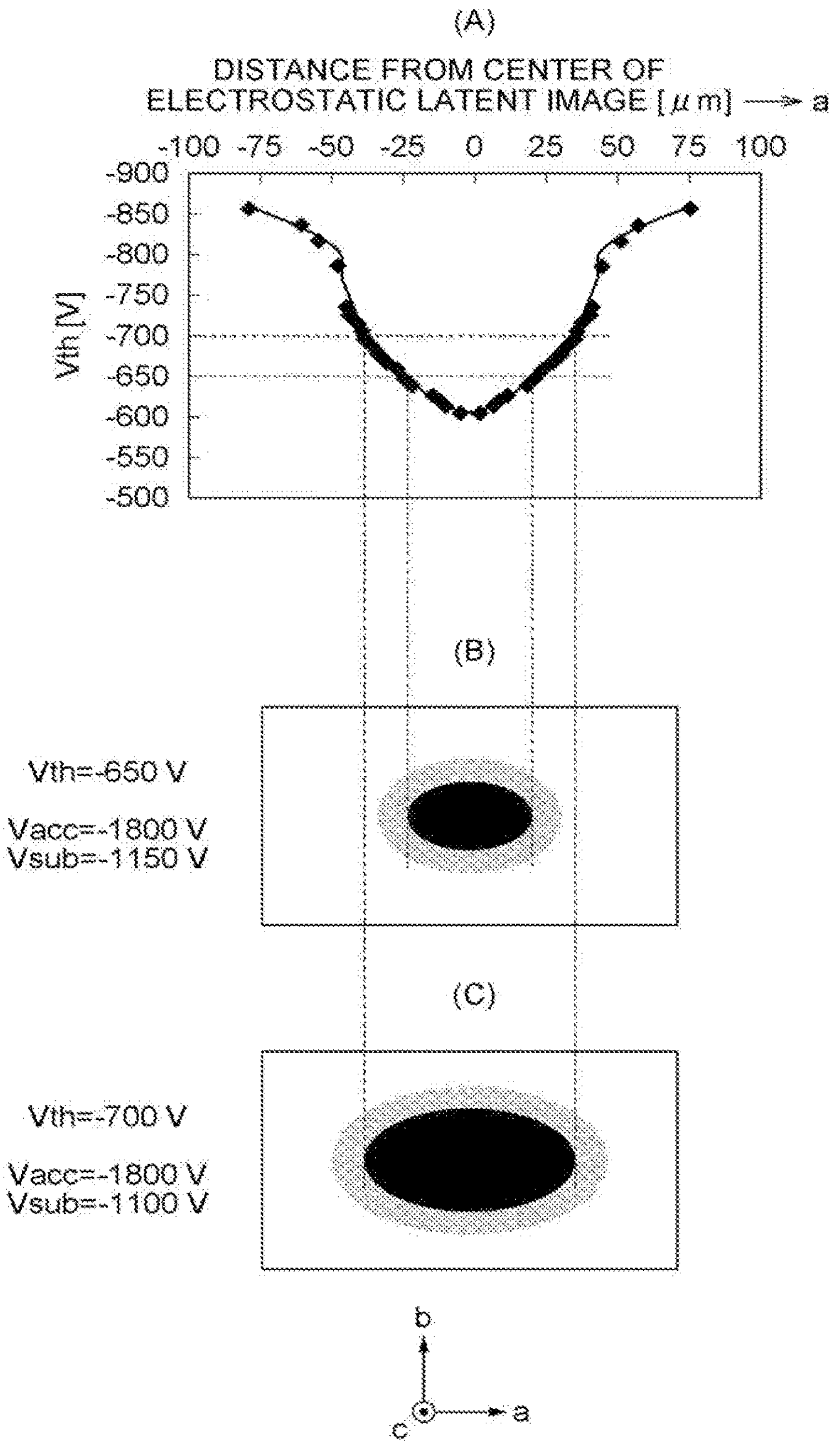
FIG. 23 is a schematic diagram that illustrates an example of the measurement result of the depth of a latent image.

FIG. 23 illustrates an example of the result of measurement of an electrostatic latent image. Vth is the difference (=Vacc−Vsub) between Vacc and Vsub.

Furthermore, the electric potential distribution V(a, b) may be determined using Vth(a, b) when the landing energy becomes nearly zero at each scanning location (a, b). Vth(a, b) has a unique correspondence relationship with the electric potential distribution V(a, b) and, if the charge distribution is smooth, Vth(a, b) is approximately equivalent to the electric potential distribution V(a, b).

At (A) in FIG. 23, the curved line indicates the relation between Vth and the distance from the center of an electrostatic latent image, and is an example of the surface potential distribution that is generated due to the charge distribution on the surface of the specimen.

Here, Vacc is −1800 V. The electric potential at the center of an electrostatic latent image is about −600 V, and the electric potential increases negatively as the distance from the center of the electrostatic latent image increases. The electric potential in a peripheral area from the center of an electrostatic latent image by more than 75 μm is about −850 V.

At (B) in FIG. 23 is a diagram of an image that is obtained from an output of the detector 402 when the setting is specified such that Vsub=−1150 V. Here, Vth=−650 V.

Furthermore, at (C) in FIG. 23 is a diagram of an image that is obtained from an output of the detector 402 when the setting is specified such that Vsub=−1100 V. Here, Vth=−700 V.

According to the method for detecting primary repulsive electrons to determine the profile of an electrostatic latent image, the surface of the specimen is scanned with an electron beam while Vacc or Vsub is changed, and Vth(a, b) is measured, whereby the surface potential information on the specimen may be obtained. Using the method, in which primary repulsive electrons is detected to determine the profile of an electrostatic latent image, it is possible to obtain the profile of an electrostatic latent image as a visible image in the order of microns, which is difficult in a typical technique known to the inventors.

In the method for detecting primary repulsive electrons to determine the profile of an electrostatic latent image, as the energy of an incident electron is extremely changed, the trajectory of an incident electron deviates, and a change in the scanning magnification or distortion sometimes occurs.

In such a case, the circumstance of a static electric field or the trajectory of an electron is calculated in advance, and a detection result is corrected in accordance with the result of a calculation; thus, the profile of an electrostatic latent image may be obtained with a higher accuracy.

As described above, using the electrostatic latent-image measurement device 300, it is possible to determine the charge distribution of an electrostatic latent image, the surface potential distribution, the electric-field intensity distribution, and the electric field intensity in a direction perpendicular to the surface of a specimen with high accuracy.

Image Forming Method

Next, an explanation is given of an embodiment of the image forming method according to the present invention.

With the image forming method according to the present embodiment, the optical output waveform, which is used to form a latent image, is the waveform for exposing a photoconductor using the optical output value, which is needed to obtain the target image density, during a predetermined time with regard to an image area, including a line image or a solid image.

Here, an image area includes multiple pixels, and is an area where toner is attached to form an image, in the image pattern. Furthermore, a non-image area is an area where no toner is attached to form no image, in the image pattern.

In the following explanation, the image density that is targeted is referred to as the "target image density". Furthermore, in the following explanation, a predetermined optical output value, which is needed to obtain the target image density, is referred to as the "target exposure output value" or the "reference optical output value". Furthermore, in the following explanation, a predetermined time for exposing the entire pixel in the image area using the target exposure output value to obtain the target image density is referred to as the "target exposure time".

Furthermore, in the following explanation, the exposure technique for exposure using the target exposure output value during the target exposure time is referred to as the "standard exposure". Moreover, in the following explanation, a solid image is an image area whose area is larger than a line image.

Furthermore, in the following explanation, exposure on a photoconductor using an optical output value that is higher than the target exposure output value during the exposure time that is shorter than the target exposure time is referred to as the "time concentration exposure". During the time concentration exposure, for example, if one pixel is exposed, the pixel is exposed during the exposure time for one pixel using the optical output values for four pixels in total, which is obtained by adding the target exposure output values for three pixels to the target exposure output value for one pixel.

Moreover, in the following explanation, the time concentration exposure is also referred to as TC (time concentration) exposure.

Figure 24:
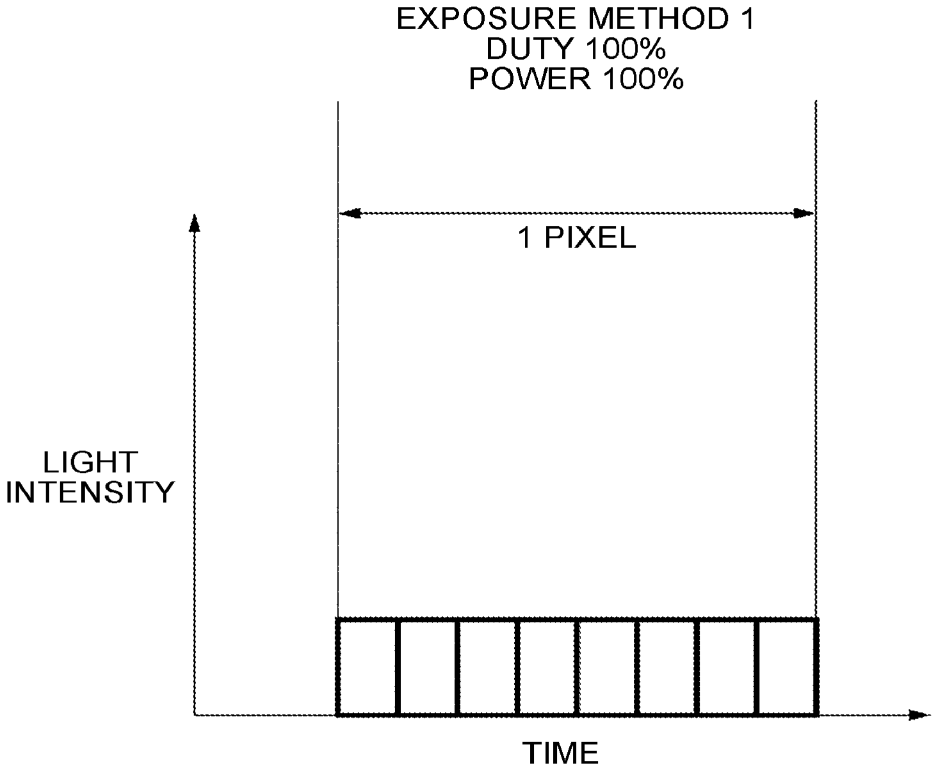
FIG. 24 is a schematic diagram that illustrates an example of a method for forming an electrostatic latent image in the reference example.

As illustrated in FIG. 24, for the exposure (hereafter, referred to as the "exposure method 1") according to the electrostatic latent-image forming method using the standard exposure in the reference example, there is a waveform for exposing a photoconductor during the target exposure time using the target exposure output value with regard to a 1-dot image area, including a line image or a solid image, as described above. Here, the target exposure output value is the optical output value of 100%, and the target exposure time is 100% at the duty ratio.

Figure 25:
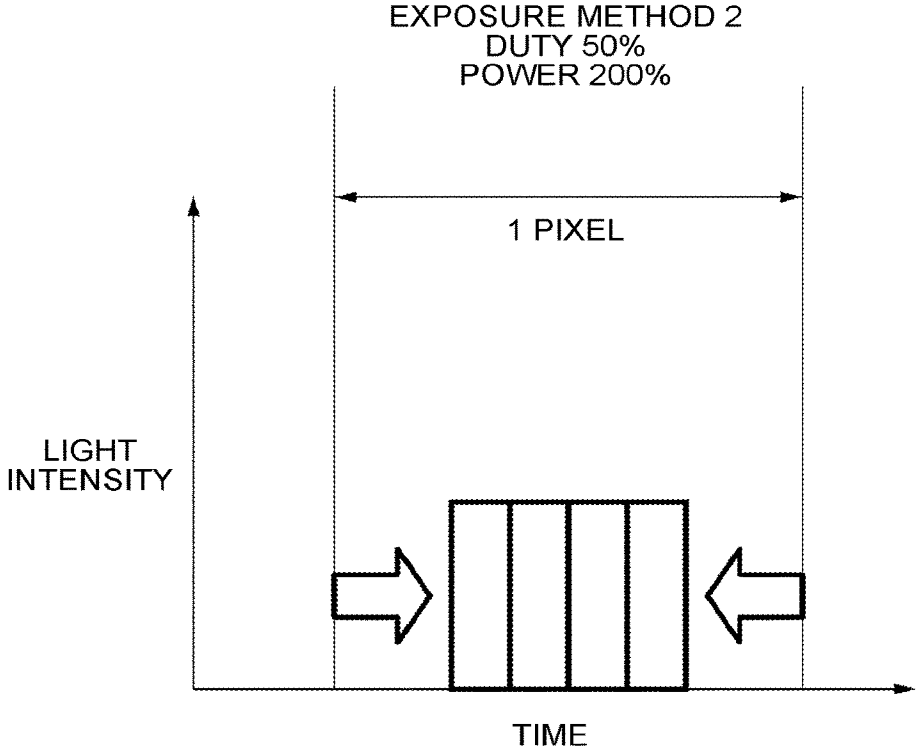
FIG. 25 is a schematic diagram that illustrates an example of a method for forming an electrostatic latent image according to the present embodiment.

As illustrated in FIG. 25, with the exposure method (hereafter, referred to as the "exposure method 2") using the time concentration exposure according to the present embodiment, the photoconductor is exposed using the optical output value, which is 200% of the target exposure output value, at the duty ratio of 50% with regard to the target exposure time. Here, if the width of the image area is 1, the width of the exposed area is a 4/8 pixel.

Figure 26:
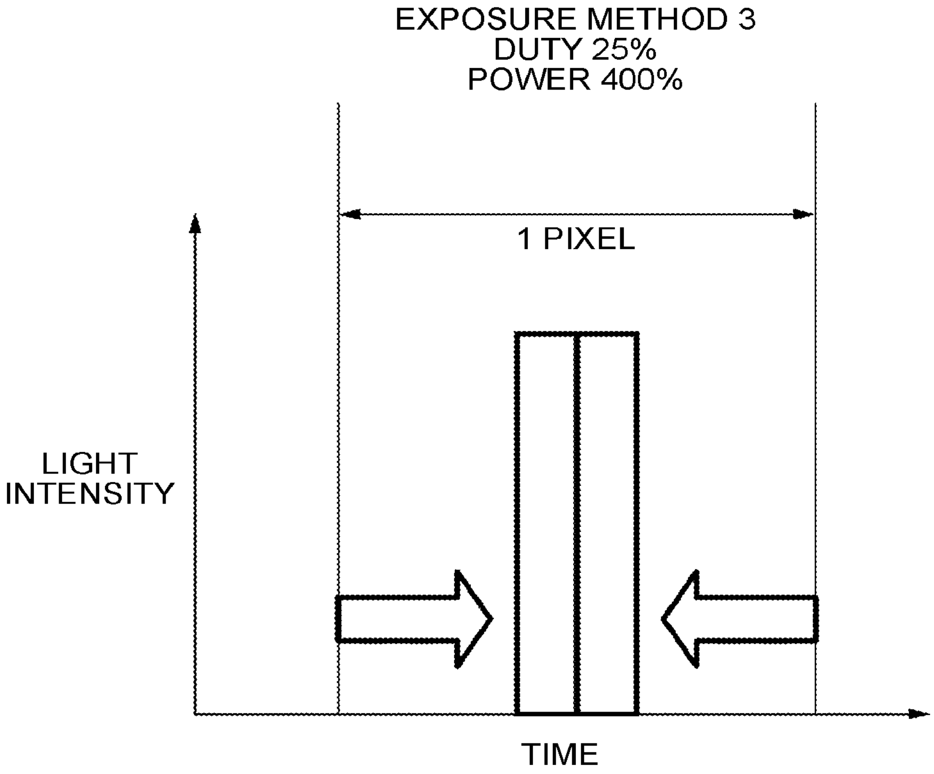
FIG. 26 is a schematic diagram that illustrates another example of the above-described method for forming an electrostatic latent image.

As illustrated in FIG. 26, with the exposure method (hereafter, referred to as the "exposure method 3") using the time concentration exposure according to the present embodiment, the photoconductor is exposed using the optical output value, which is 400% of the target exposure output value, at the duty ratio of 25% with regard to the target exposure time. If the width of the image area is 1, the width of the exposed area is a 2/8 pixel.

Figure 27:
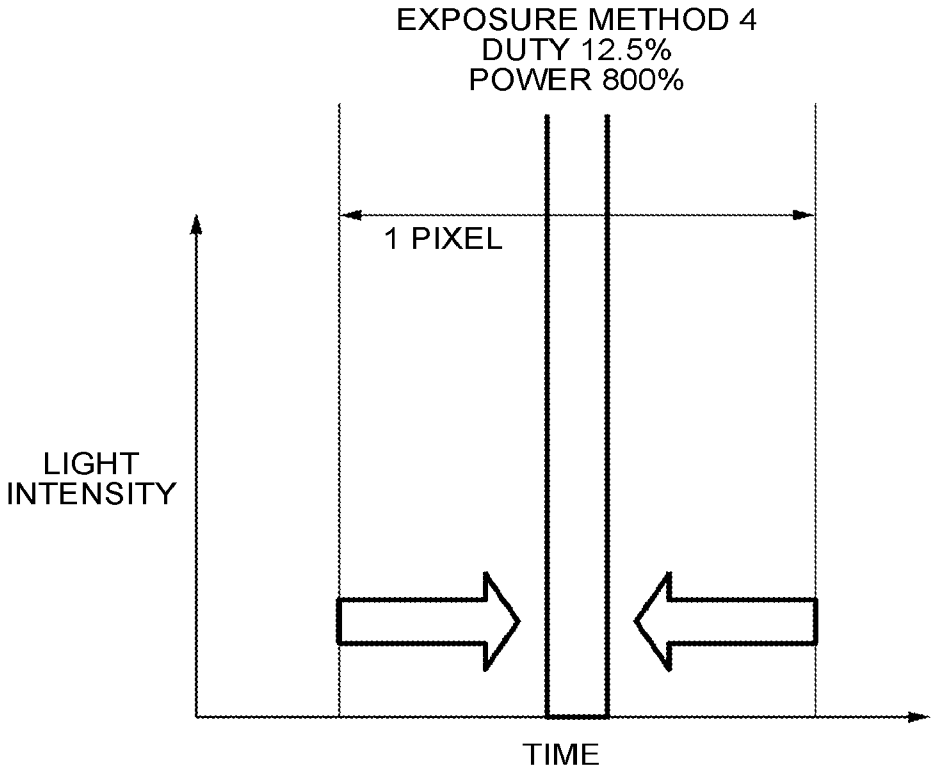
FIG. 27 is a schematic diagram that illustrates further another example of the above-described method for forming an electrostatic latent image.

As illustrated in FIG. 27, with the exposure method (hereafter, referred to as the "exposure method 4") using the time concentration exposure according to the present embodiment, the photoconductor is exposed using the optical output value, which is 800% of the target exposure output value, at the duty ratio of 12.5% with regard to the target exposure time. If the width of the image area is 1, the width of the exposed area is a 1/8 pixel.

In the exposure methods 2 to 4 that are described above, the pulse width is narrow as compared to the exposure method 1. Specifically, according to the exposure methods 2 to 4, if exposure is conducted using the same light intensity as in the exposure method 1, the formed latent image is small; therefore, the light intensity is controlled in accordance with the pulse width so that the integrated light intensity during formation of a latent image becomes the same. Furthermore, according to the exposure methods 2 to 4 that use the time concentration exposure, exposure is conducted using the short pulse width and the high light intensity as compared to the exposure method 1 that uses the standard exposure.

In the above explanation, according to each of the exposure methods 2 to 4, the optical output value is set such that the integrated light intensity becomes the same; however, with the electrostatic latent-image forming method according to the present invention, the foregoing is not a limitation on the optical output value.

The image forming apparatus is used as an on-demand printing system for simple printing due to an increase in the demand for high-speed image formation, and there are needs for high quality and high accuracy of images.

With the image forming apparatus that implements the exposure method 1, one of the techniques for achieving high image quality is that the beam size during exposure is made smaller to form a small electrostatic latent image so as to improve the resolving power.

However, reducing the beam size to uniform each image height causes an increase in costs. The cost for reducing the beam size has a high percentage of the cost of the entire image forming apparatus. Therefore, there is a need to form micro electrostatic latent images without reducing the beam size during exposure.

Furthermore, the problems in image formation by the image forming apparatus with the electrophotographic system include reproducibility of micro-sized characters. Particularly, there is demand to form an output image in which it is possible to recognize a micro-sized character that is equivalent to 2 or 3 points in the case of 1200 dpi, especially, a micro-sized reversed character that is a void.

In the image forming apparatus with the electrophotographic system, the quality of the finally output image is largely affected by a successful or failed result during each process, i.e., charging, exposure, developing, transfer, or fixing. Especially, the state of an electrostatic latent image, formed on the photoconductor during an exposure process, is an important factor that directly affects the behavior of toner particles. Therefore, with the image forming apparatus, an improvement in electrostatic latent images, formed on the photoconductor during an exposure process, is extremely important in forming high-quality images.

With the electrostatic latent-image forming method according to the present embodiment, a narrow area of the image area, which forms the image in the image pattern, is exposed with strong light in a concentrated manner. Thus, with the electrostatic latent-image forming method according to the present embodiment, it is possible to improve fidelity of output image patterns in a size smaller than the beam diameter, i.e., in a micro size that is unignorably affected by the size of the beam diameter, and it is possible to adjust the image pattern to the desired image density.

With the electrostatic latent-image forming method according to the present embodiment, it is possible to form output images while both the micro-sized image pattern formation and the desired image density are achieved.

Furthermore, the electrostatic latent-image forming method according to the present embodiment may be easily applied to any image patterns without performing special processing, such as edge detection or character information recognition.

With the electrostatic latent-image forming method according to the present embodiment, image patterns may be generated even in a case where it is difficult to acquire the object information from the computer when the image data is converted into light-source modulation data.

With the electrostatic latent-image forming method according to the present embodiment, it is possible to form output images while both the micro-sized image pattern formation and the desired image density are achieved without relating the image data and the light-source modulation data on a character basis.

The electrostatic latent-image forming method according to the present embodiment uses the PM+PWM, which is the combination of the phase modulation (PM) and the pulse width modulation (PWM). Furthermore, as the electrostatic latent-image forming method according to the present embodiment uses the time concentration exposure, during which the maximum optical output is purposefully increased, so that the integrated light intensity of the image pattern during exposure may have the same value as during the standard exposure.

With the electrostatic latent-image forming method according to the present embodiment, deep latent images are formed so that the resolving power of the image pattern may be improved without changing the image density of the image pattern.

Application Example (1) of the Time Concentration Exposure

Next, an explanation is given of an application example of the time concentration exposure using the electrostatic latent-image forming method according to the present embodiment. The electrostatic latent-image forming method according to the present embodiment is applied to image patterns that are images in multiple colors, which is the combination of color plates, and that includes the combination of image areas, which include multiple pixels. With the electrostatic latent-image forming method according to the present embodiment, a part of pixels to be exposed in each of the image areas is set as a non-exposure pixel group based on the position of any one of the image areas. Furthermore, with the electrostatic latent-image forming method according to the present embodiment, pixels different from pixels of the non-exposure pixel group in each of the image areas are set as a high-output exposure pixel group, which is exposed using the optical output value that is higher than the predetermined optical output value that is needed to expose the image area, i.e., which is subjected to the time concentration exposure.

Figure 28:
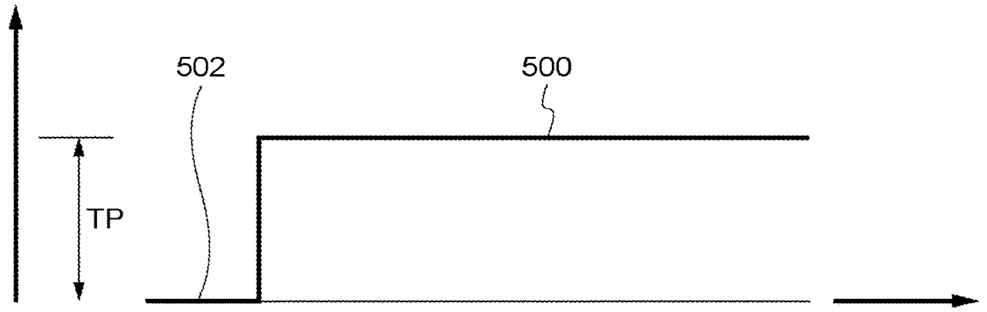
FIG. 28 is a schematic diagram that illustrates an example of the method for forming an electrostatic latent image according to the standard exposure.

As illustrated in FIG. 28, with the electrostatic latent-image forming method that uses the standard exposure, the photoconductor is exposed using the target exposure output value TP (the optical output value of 100%) during the target exposure time (100% at the duty ratio) as described above with regard to the image pattern that includes an image area 500 and a non-image area 502.

Figure 29:
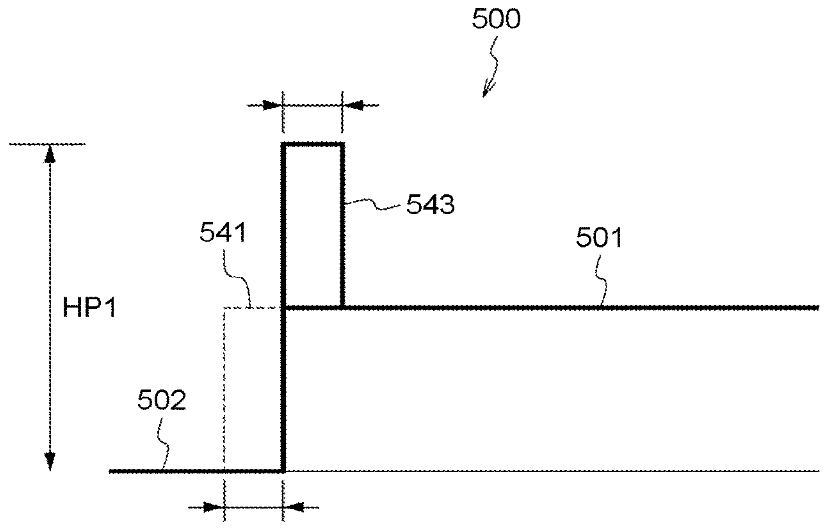
FIG. 29 is a schematic diagram that illustrates an example of the method for forming an electrostatic latent image according to the time concentration exposure.

As illustrated in FIG. 29, during the time concentration exposure according to the present embodiment, part of the image area 500, i.e., the area that is equivalent to a certain number of pixels, e.g., the boundary section (hereafter, also referred to as the "edge section") between the image area 500 and the non-image area 502, is not exposed as a non-exposure pixel group 541. In this case, during the time concentration exposure according to the present embodiment, a certain number of pixels from the boundary section between the image area 500 and the non-exposure pixel group 541 are set as a high-output exposure pixel group 543. To the high-output exposure pixel group 543, a high-exposure output value HP1, which is the addition of the target exposure output value and the integrated energy, which is equivalent to the target exposure output value of the non-exposure pixel group, is applied. FIG. 29 illustrates an example in which, for the time concentration exposure, the equivalence of one pixel in the edge section is set as the non-exposure pixel group 541 and the target exposure output value, which is equivalent to the one pixel, is added to the high-output exposure pixel group 543 that is equivalent to one pixel so that exposure is conducted using the high-exposure output value HP1 that is equivalent to 200% of the target exposure output value.

For the time concentration exposure according to the present embodiment, appropriate values may be set to the number of pixels in the non-exposure pixel group and the number of pixels in the high-output exposure pixel group in accordance with conditions, e.g., the image quality of the image to be formed. Furthermore, an appropriate value may be set to the optical output value for exposing the high-output exposure pixel group in a case where the edge section is too clear, i.e., too sharp, in a case where the reproducibility of a void character needs to be improved, or the like.

Figure 30:
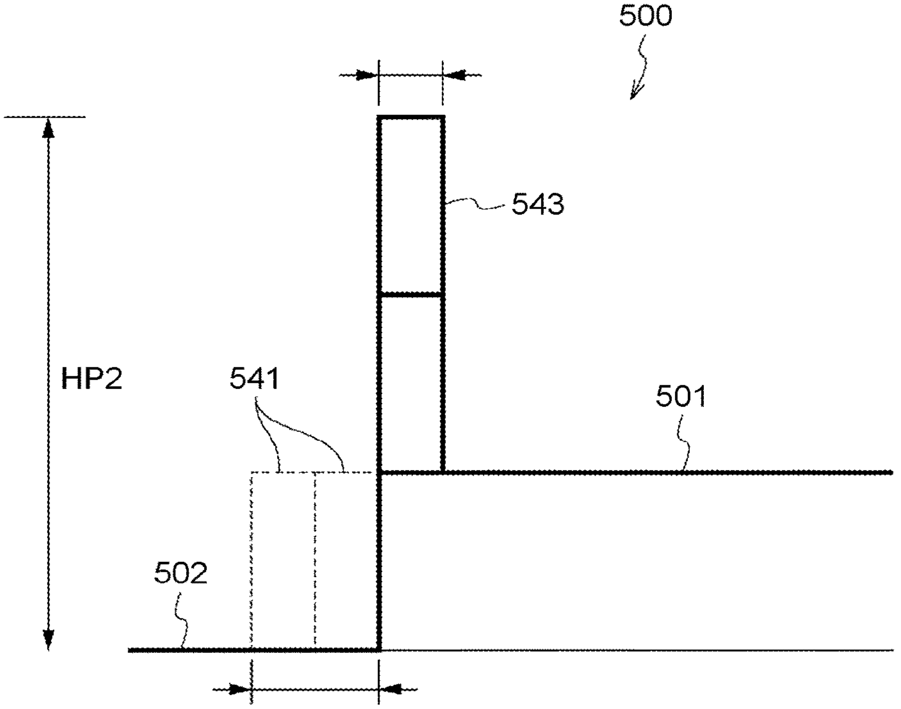
FIG. 30 is a schematic diagram that illustrates another example of the method for forming an electrostatic latent image according to the time concentration exposure.

FIG. 30 illustrates an example in which, for the time concentration exposure, the equivalence of two pixels in the edge section between the image area 500 and the non-image area 502 is set as the non-exposure pixel group 541. In this example, the target exposure output value, which is equivalent to the two pixels, is added to the high-output exposure pixel group 543 that is equivalent to one pixel so that exposure is conducted using a high-exposure output value HP2 that is equivalent to 300% of the target exposure output value, and a different exposed area 501 is exposed using the target exposure output value.

Figure 31:
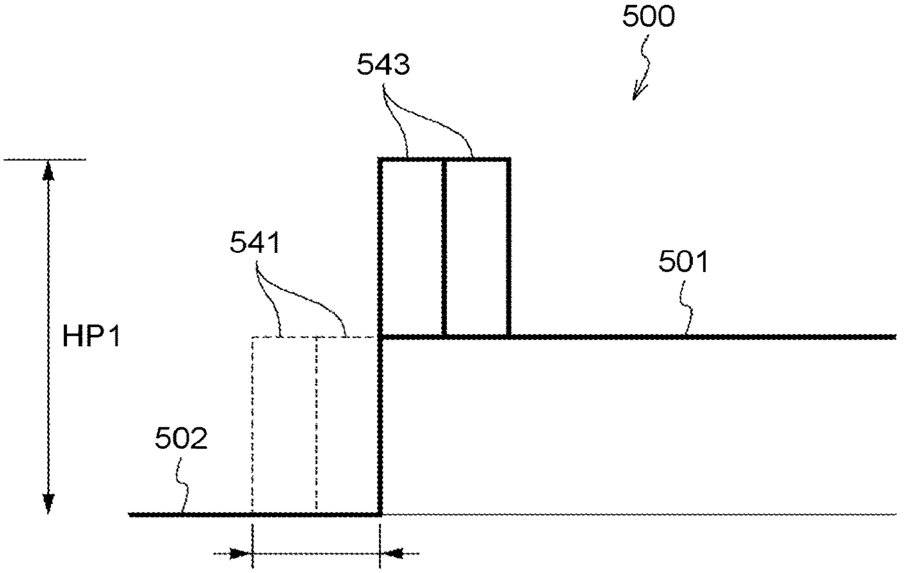
FIG. 31 is a schematic diagram that illustrates further another example of the method for forming an electrostatic latent image according to the time concentration exposure.

FIG. 31 illustrates an example in which, for the time concentration exposure, the equivalence of two pixels in the edge section between the image area 500 and the non-image area 502 is set as the non-exposure pixel group 541. In this example, the target exposure output value, which is equivalent to the two pixels, is added to the high-output exposure pixel group 543 that is equivalent to two pixels so that exposure is conducted on each pixel using the high-exposure output value HP1, which is equivalent to 200% of the target exposure output value, and the different exposed area 501 is exposed using the target exposure output value.

With regard to the image that includes multicolor image patterns, which are formed in combination of image areas in different color plates, the quality of output images sometimes degrades due to the positional deviation of the color plates that are caused by individual variability or time changes in the image forming apparatus. In such a case, according to the present embodiment, the above-described time concentration exposure is conducted on part of each image area to eliminate or reduce the positional deviation of each image area in the image pattern, which includes multiple image areas in different color plates in combination, thereby forming high-quality images.

The difference between the color plates, i.e., the amount of positional deviation, may be detected by making the laser printer 1000 print the positional-deviation detection chart that presents the positional-deviation detection pattern and by comparing the positional-deviation detection patter with the positional-deviation detection pattern in the normal state. Furthermore, in the present embodiment, the method of detecting the amount of positional deviation of multiple image areas is not limited to the foregoing, and the amount of positional deviation may be detected using various methods.

Figure 32:
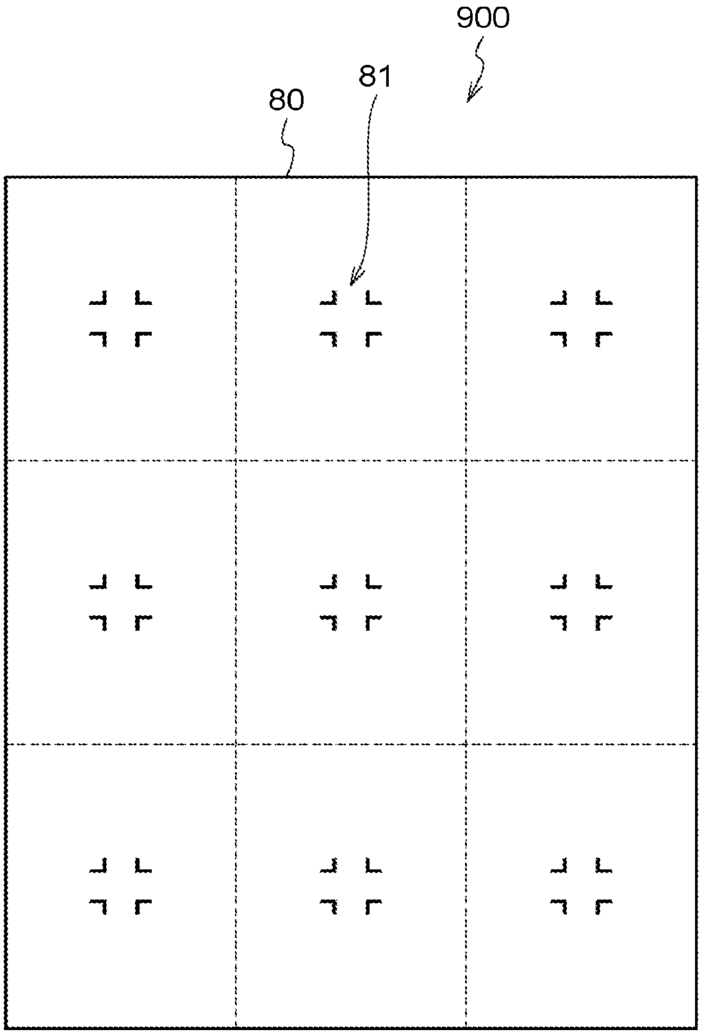
FIG. 32 is a schematic view that illustrates an example of a positional-deviation detection chart.

As illustrated in FIG. 32, in a positional-deviation detection chart 900, the printed sheet surface is divided into predetermined areas 80, and a positional-deviation detection pattern 81 is presented on each of the divided areas 80. Using the positional-deviation detection chart 900, it is possible to determine the presence or absence of deviation of the color plates in each area and the amount of deviation.

Figure 33:
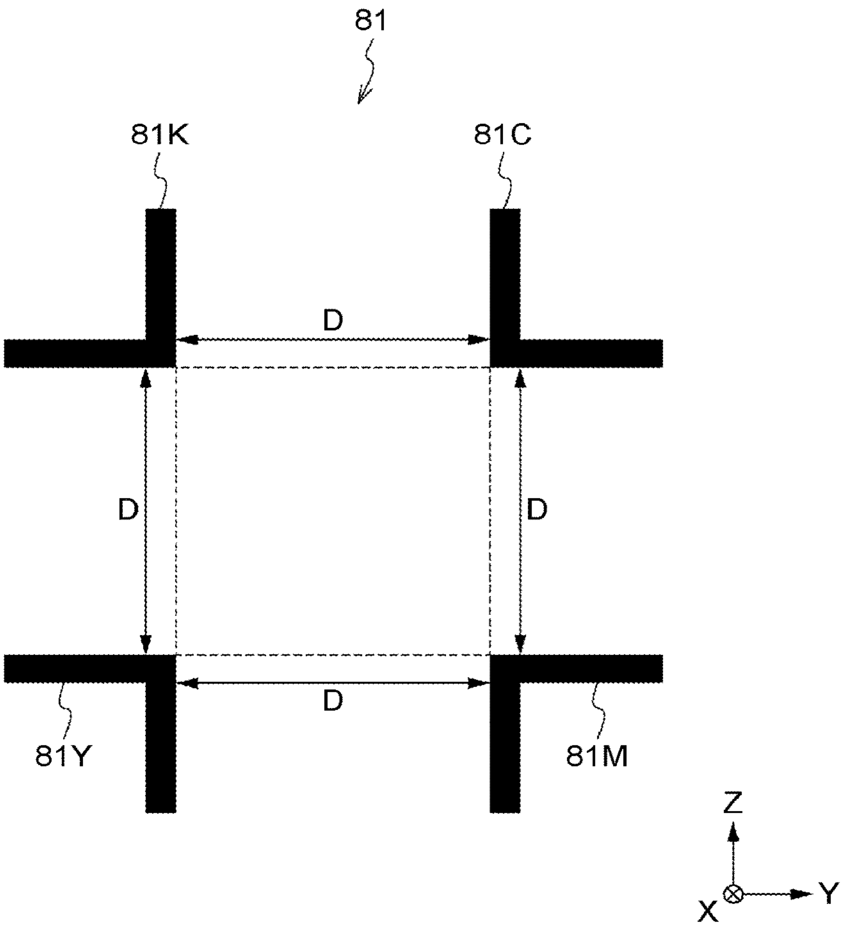
FIG. 33 is a schematic view that illustrates an example of a positional-deviation detection pattern.

As illustrated in FIG. 33, the positional-deviation detection patterns 81 are output at different areas for the respective color plates, e.g., C, M, Y, and K, that may be output by the laser printer 1000. The positional-deviation detection patterns 81 include a pattern 81C in the cyan color plate, a pattern 81M in the magenta color plate, a pattern 81Y in the yellow color plate, and a pattern 81K in the black color plate. It is preferable that the positional-deviation detection pattern 81 includes a straight line that is parallel in, for example, the main scanning direction (the direction of the axis Y) and the sub-scanning direction (the direction of the axis Z) so that the amount of positional deviation of the patterns 81C, 81M, 81Y, and 81K is easily recognized. In FIG. 33, the patterns 81C, 81M, 81Y, and 81K of the positional-deviation detection pattern 81 are disposed at regular intervals D, and no positional deviation occurs in each color plate in the ideal state.

Figure 34:
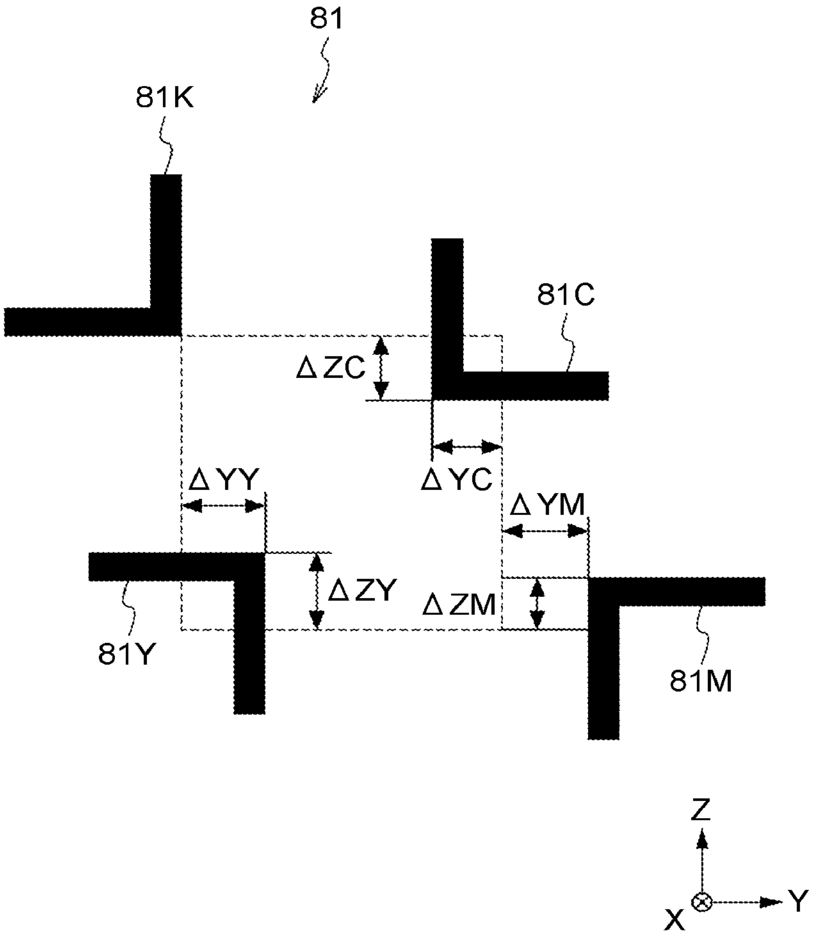
FIG. 34 is a schematic view that illustrates an example of the positional-deviation detection pattern in which positional deviations occur.

As illustrated in FIG. 34, in the positional-deviation detection pattern 81 where color shift occurs, it is possible that the pattern in any color plate, e.g., the pattern 81K in the black color plate in FIG. 34, is used as a reference to detect the amount of deviation of the patterns 81C, 81M, and 81Y in the other color plates in the main scanning direction and in the sub-scanning direction. In FIG. 34, it is understood that the pattern 81C is shifted by $-\Delta YC$ in the main scanning direction and by $-\Delta ZC$ in the sub-scanning direction. Similarly, it is understood that the pattern 81M is shifted by $\Delta YM$ in the main scanning direction and by ZM in the sub-scanning direction. Furthermore, it is understood that the pattern 81Y is shifted by $\Delta YY$ in the main scanning direction and by $\Delta ZY$ in the sub-scanning direction.

Furthermore, with the laser printer 1000, using the positional-deviation detection chart 900 where the positional-deviation detection pattern 81 is formed at each predetermined area, the average amount of deviation of color plates relative to the normal positional-deviation detection pattern 81 may be determined for each area.

For example, in a predetermined area of the image data, if the position of the pattern 81K is used as a reference, the amount of positional deviation of the pattern 81C is ΔYC=4 dots and ΔZC=2 dots, and the amount of positional deviation of the pattern 81M is ΔYM=6 dots and ΔZM=−4 dots. In this case, if the image includes the C color plate and the M color plate, the average positions of the C color plate and the M color plate using the pattern 81K as a reference are 5 dots in the main scanning direction and −1 dot in the sub-scanning direction where the pattern 81K is used as a reference. As for the amount of positional deviation of each color plate from the average position, the amount of positional deviation of the pattern 81C is ΔYC=−1 dot and ΔZC=3 dots, and the amount of positional deviation of the pattern 81M is ΔYM=1 dot and ΔZM=−3 dots.

Based on the amount of positional deviation that is detected as described above, the laser printer 1000 performs an operation to form an exposure pattern using the electrostatic latent-image forming method according to the present embodiment.

Operation to Form an Exposure Pattern

An explanation is given of an example of the operation to form an exposure pattern according to the time concentration exposure using the electrostatic latent-image forming method according to the present embodiment. In the following example of the operation to form an exposure pattern, an explanation is given of the case where the resolution is set to 600 dpi. Furthermore, in the following example of the operation to form an exposure pattern, for ease of explanation, an explanation is given using the image pattern that is formed of only the C color plate and the M color plate among the C, M, Y, and K color plates that are used for image formation of color images.

Figure 35:
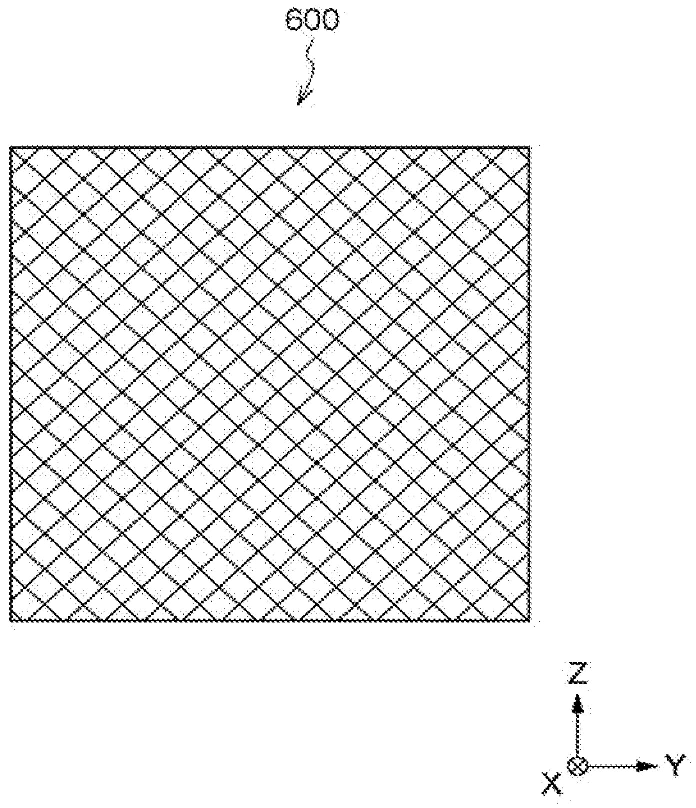
FIG. 35 is a schematic view that illustrates an image pattern in the example of the operation to form an exposure pattern.

In the example of the image pattern that is illustrated in FIG. 35, an image pattern 600 is formed from the C color plate and the M color plate in a predetermined area of the image data.

Figure 36:
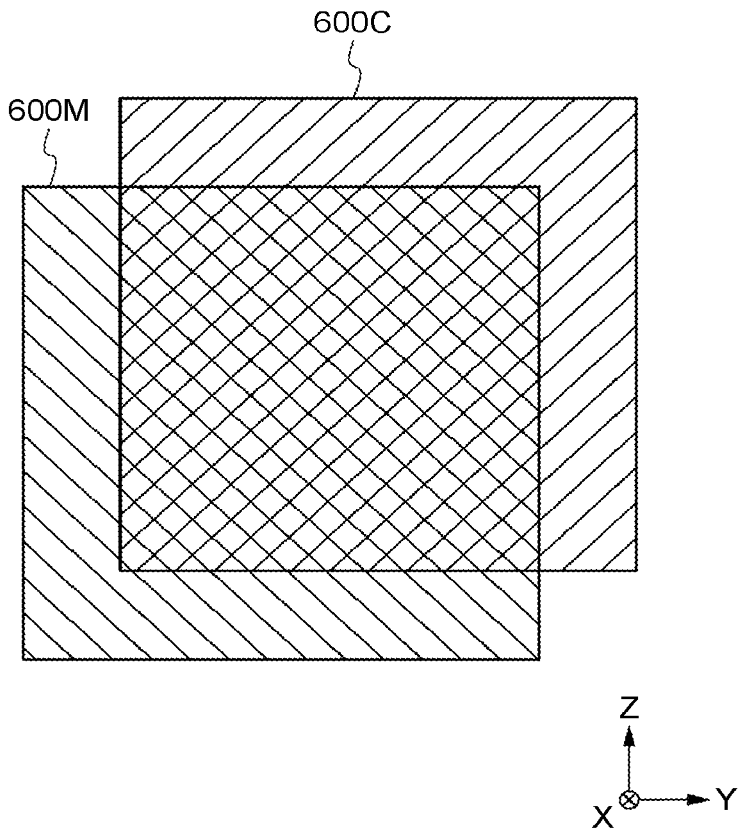
FIG. 36 is a schematic view that illustrates an image pattern in which a positional deviation occurs in the example of the operation to form an exposure pattern.

As illustrated in FIG. 36, in the example of the above-described image pattern 600, a positional deviation occurs in an image area 600C in the C color plate with an image area 600M in the M color plate as a reference. In this case, if the image area 600M is used as a reference, the amount of positional deviation of the image area 600C is 2 dots in the main scanning direction and 2 dots in the sub-scanning direction.

Figure 37:
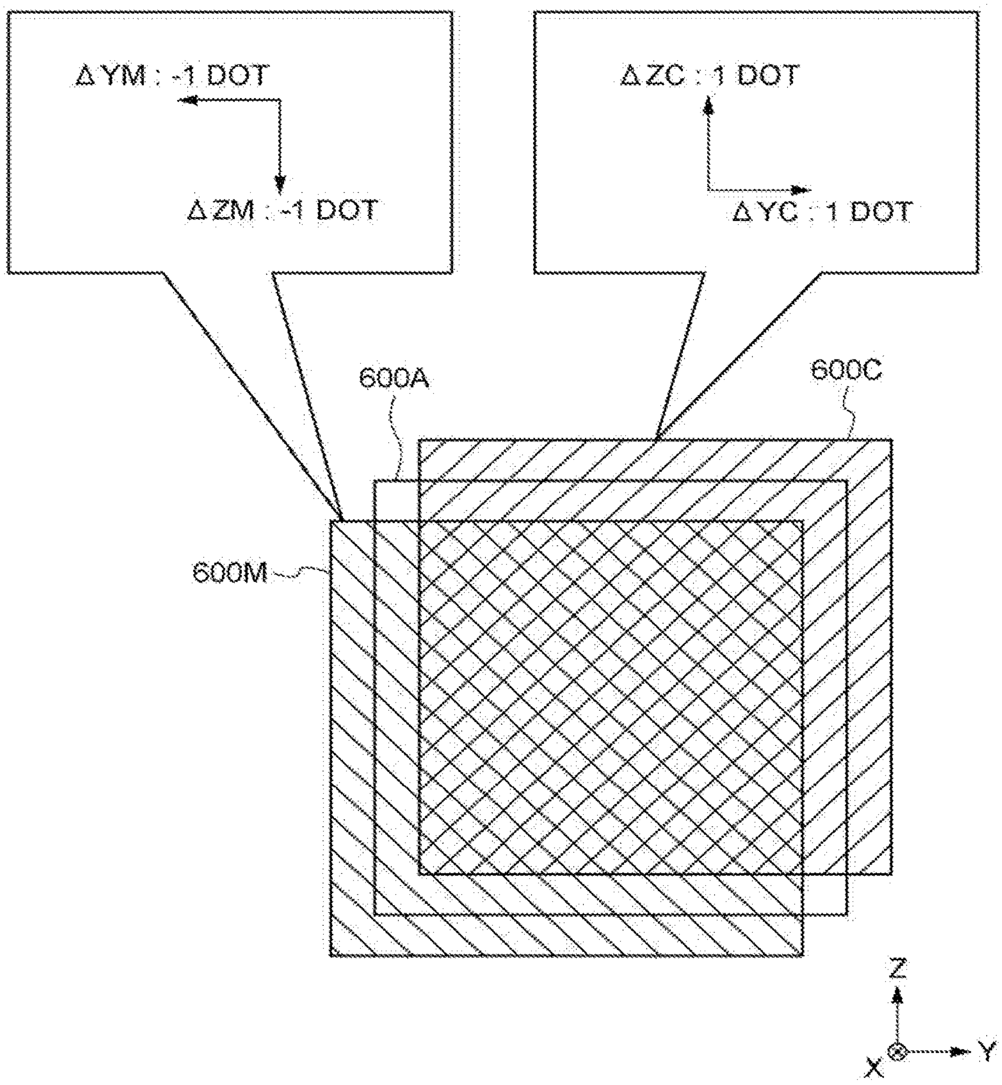
FIG. 37 is a schematic view that illustrates the amount of positional deviation and the average position of the image pattern of FIG. 36.

As illustrated in FIG. 37, an average position 600A, which corresponds to the middle position between multiple image areas, i.e., the image area 600C and the image area 600M, is located by 1 dot in the main scanning direction and by 1 dot in the sub-scanning direction relative to each of the image area 600C and the image area 600M. Therefore, the amount of positional deviation of the image area 600C with the average position 600A as a reference is ΔYC=1 dot and ΔZC=1 dot. Furthermore, the amount of positional deviation of the image area 600M with the average position 600A as a reference is ΔYM=−1 dot and ΔZM=−1 dot.

Figure 38:
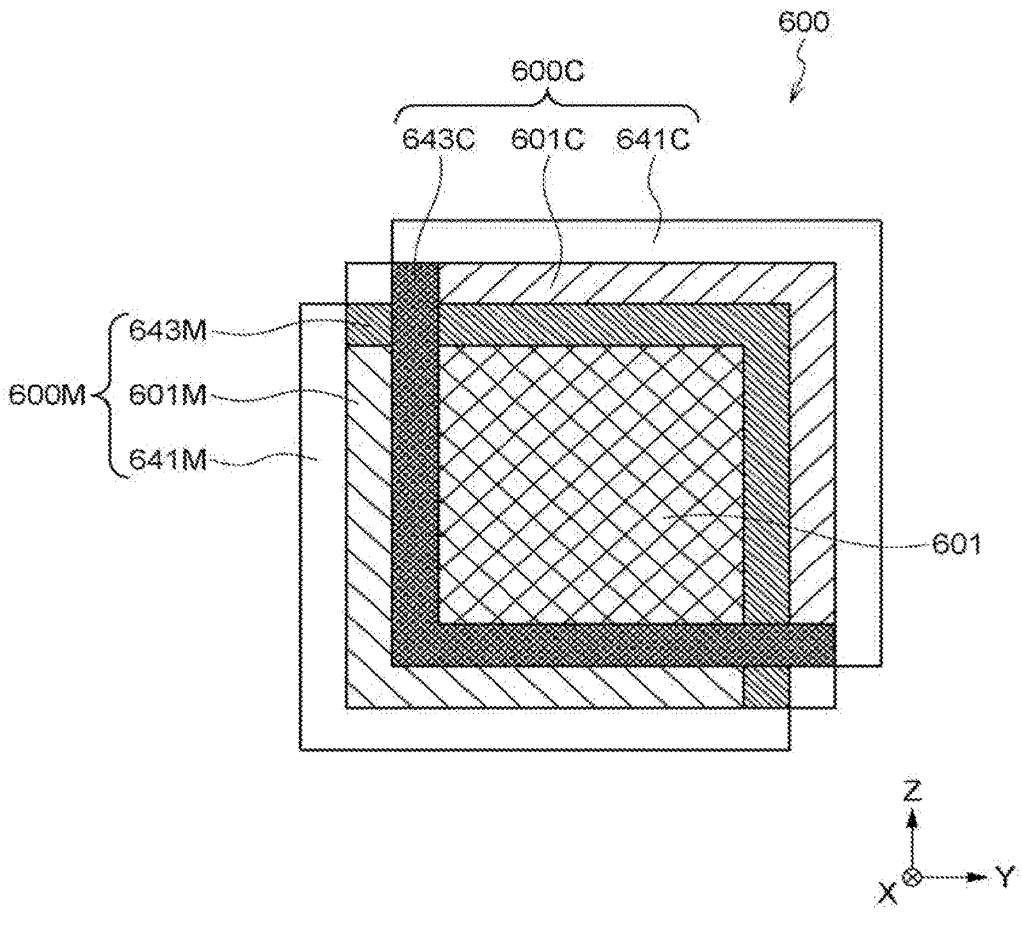
FIG. 38 is a schematic view that illustrates an exposure pattern in the example of the operation to form an exposure pattern.

As illustrated in FIG. 38, with the electrostatic latent-image forming method according to the present embodiment, an exposure pattern of the time concentration exposure is determined so as to reduce the above-described amount of positional deviation.

Specifically, in the image pattern 600, the image area 600C is shifted from the average position by 1 dot in the main scanning direction and by 1 dot in the sub-scanning direction. To eliminate the amount of positional deviation that occurs in the image area 600C, pixels of the image area 600C in each of the above-described directions are set as a non-exposure pixel group 641C. Similarly, in the image pattern 600, the image area 600M is shifted from the average position by −1 dot in the main scanning direction and by −1 dot in the sub-scanning direction. To eliminate the amount of positional deviation that occurs in the image area 600M, pixels of the image area 600M in each of the above-described directions are set as a non-exposure pixel group 641M.

With regard to the image area 600C, the exposure amount that is reduced by disposing the non-exposure pixel group 641C is added to a high-output exposure pixel group 643C that is disposed on the area on the opposite side of the side on which the non-exposure pixel group 641C is disposed with reference to the edge of the image area 601C. The high-output exposure pixel group 643C is disposed on the area by −1 dot in the main scanning direction and by −1 dot in the sub-scanning direction from the edge of the image pattern 601. Furthermore, with regard to the image area 600M, the exposure amount that is reduced by disposing the non-exposure pixel group 641M is added to a high-output exposure pixel group 643M that is disposed on the area on the opposite side of the side on which the non-exposure pixel group 641M is disposed with reference to the edge of the image area 601M. The high-output exposure pixel group 643M is disposed on the area by 1 dot in the main scanning direction and by 1 dot in the sub-scanning direction from the edge of the image pattern 601 toward the center of image area 600. The optical output values of the high-output exposure pixel groups 643C and 643M are 200% of the target exposure output value.

With the electrostatic latent-image forming method according to the present embodiment, the above-described operation is performed on each of the areas of the positional-deviation detection chart 900.

Thus, with the electrostatic latent-image forming method according to the present embodiment, it is possible to improve the image quality of image patterns that includes multiple image areas.

Application Example (2) of the Time Concentration Exposure

An explanation is given of another application example of the time concentration exposure using the electrostatic latent-image forming method according to the present embodiment. The present embodiment is different from the above-described example only in the operation to form an exposure pattern according to the time concentration exposure. In the following example of the operation to form an exposure pattern, an explanation is given of the image pattern that is formed from only the C color plate and the M color plate, where the resolution is set to 600 dpi as is the case with the above-described example.

Figure 39:
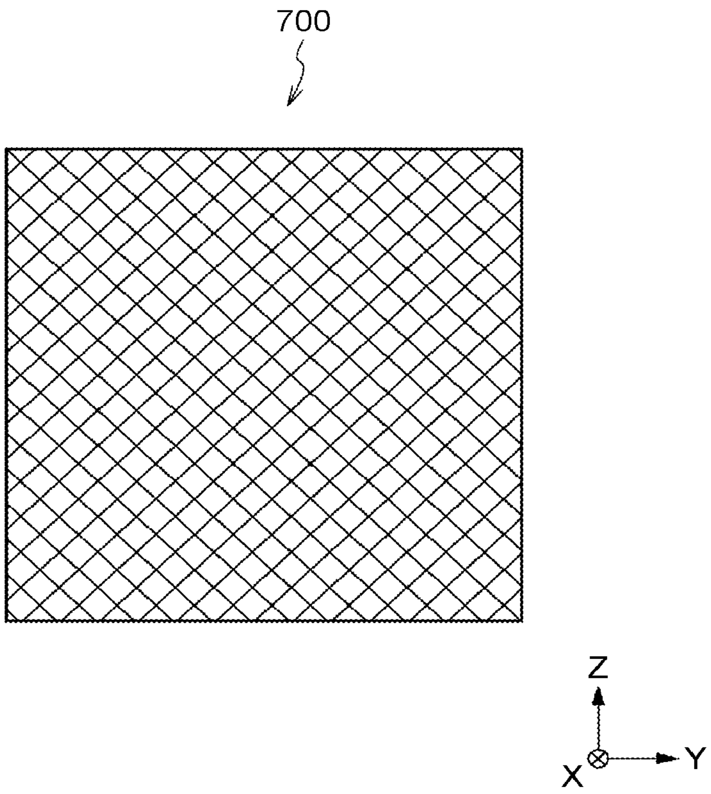
FIG. 39 is a schematic view that illustrates an image pattern in another example of the operation to form an exposure pattern.

In the example of the image pattern that is illustrated in FIG. 39, an image pattern 700 is formed from the C color plate and the M color plate in a predetermined area of the image data.

Figure 40:
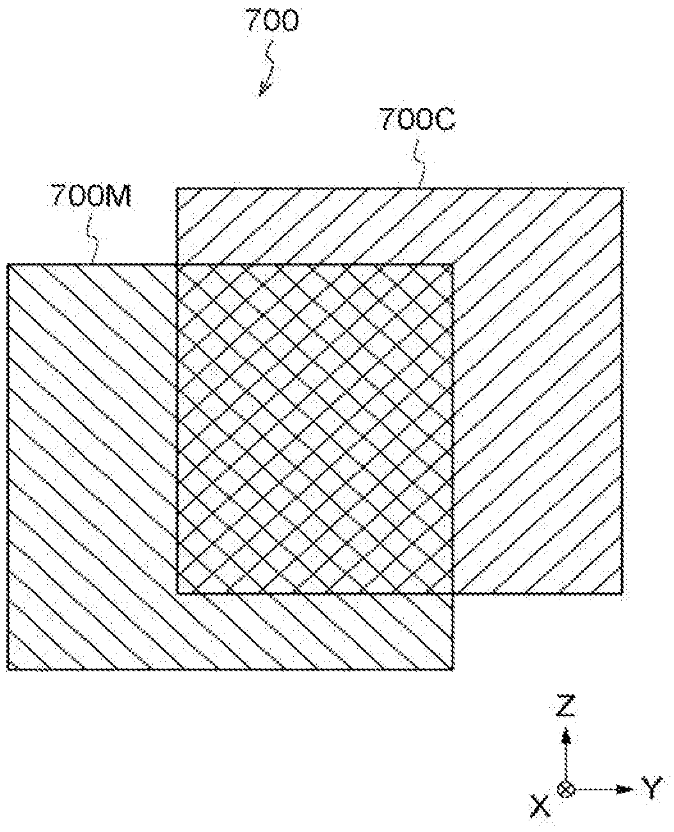
FIG. 40 is a schematic view that illustrates an image pattern in which a positional deviation occurs in another example of the operation to form an exposure pattern.

As illustrated in FIG. 40, in the example of the above-described image pattern 700, a positional deviation occurs in an image area 700C in the C color plate with an image area 700M in the M color plate as a reference. In this case, if the image area 700M is used as a reference, the amount of positional deviation of the image area 700C is 4 dots in the main scanning direction and 2 dots in the sub-scanning direction.

Figure 41:
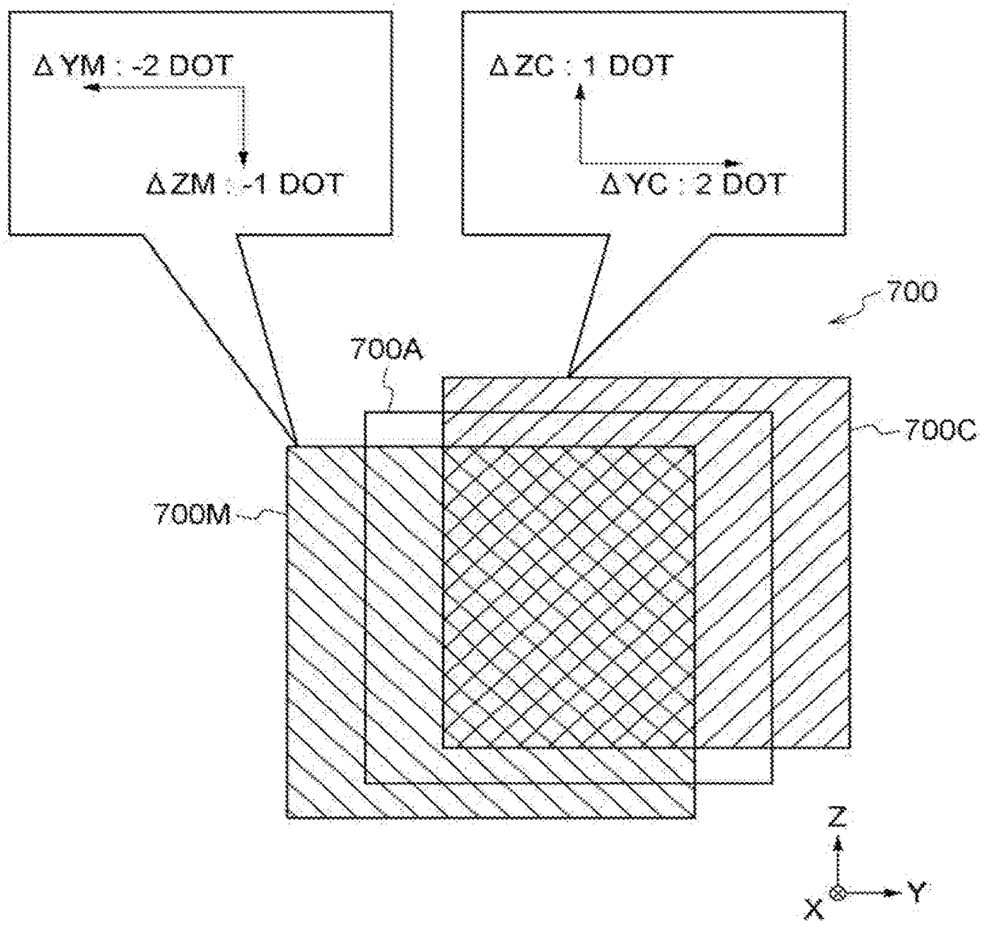
FIG. 41 is a schematic view that illustrates the amount of positional deviation and the average position of the image pattern of FIG. 40.

As illustrated in FIG. 41, an average position 700A, which corresponds to the middle position between multiple image areas, i.e., the image area 700C and the image area 700M, is located by 2 dots in the main scanning direction and by 1 dot in the sub-scanning direction relative to each of the image area 700C and the image area 700M. Therefore, the amount of positional deviation of the image area 700C with the average position 700A as a reference is ΔYC=2 dots and ΔZC=1 dot. Furthermore, the amount of positional deviation of the image area 700M with the average position 700A as a reference is ΔYM=−2 dots and ΔZM=−1 dot.

Figure 42:
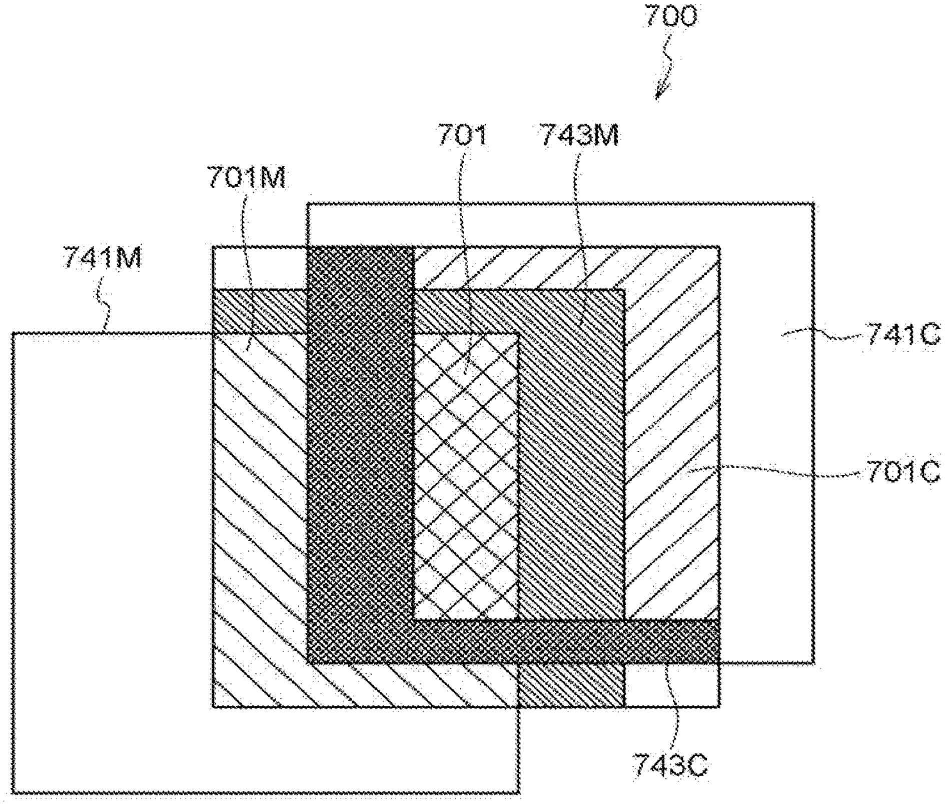
FIG. 42 is a schematic view that illustrates an exposure pattern in another example of the operation to form an exposure pattern.

As illustrated in FIG. 42, with the electrostatic latent-image forming method according to the present embodiment, an exposure pattern of the time concentration exposure is determined so as to reduce the above-described amount of positional deviation. In the image pattern 700, an image area 701C is shifted from the average position by 2 dots in the main scanning direction and by 1 dot in the sub-scanning direction. To eliminate the amount of positional deviation that occurs in the image area 701C, pixels of the image area 701C in each of the above-described directions are set as a non-exposure pixel group 741C. Similarly, in the image pattern 700, an image area 701M is shifted from the average position by −2 dots in the main scanning direction and by −1 dot in the sub-scanning direction. To eliminate the amount of positional deviation that occurs in the image area 700M, pixels of the image area 701M in each of the above-described directions are set as a non-exposure pixel group 741M.

With regard to the image area 701C, the exposure amount that is reduced by disposing the non-exposure pixel group 741C is added to a high-output exposure pixel group 743C that is disposed on the area on the opposite side of the side on which the non-exposure pixel group 741C is disposed with reference to the edge of the image area 701C. The high-output exposure pixel group 743C is disposed on the area by −1 dot in the main scanning direction and by −1 dot in the sub-scanning direction from the edge of the image pattern 701 toward the center of the image area. Furthermore, with regard to the image area 701M, the exposure amount that is reduced by disposing the non-exposure pixel group 741M is added to a high-output exposure pixel group 743M that is disposed on the area on the opposite side of the side on which the non-exposure pixel group 741M is disposed with reference to the edge of the image area 701M. The high-output exposure pixel group 743M is disposed on the area by 1 dot in the main scanning direction and by 1 dot in the sub-scanning direction from the edge of the image pattern 701 toward the center of the image area. The optical output values of the high-output exposure pixel groups 743C and 743M are 200% of the target exposure output value.

Thus, with the electrostatic latent-image forming method according to the present embodiment, it is possible to improve the image quality of image patterns that includes multiple image areas.

Application Example (3) of the Time Concentration Exposure

An explanation is given of a different application example of the time concentration exposure using the electrostatic latent-image forming method according to the present embodiment. The present embodiment is different from the above-described example in only the operation to form an exposure pattern according to the time concentration exposure. In the following example of the operation to form an exposure pattern, an explanation is given of a case where the present invention is applied to the actual character.

Figure 43:
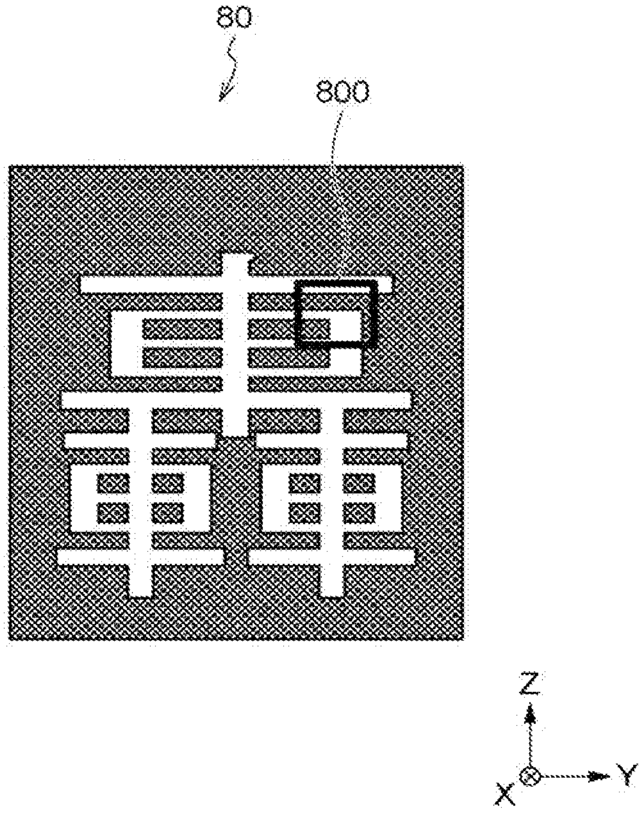
FIG. 43 is a schematic view that illustrates an image pattern in further another example of the operation to form an exposure pattern.

As illustrated in FIG. 43, in a case where an image pattern 80, including a complicated character such as "轟", is printed as a void character in a relatively small point with the width of a thick line as the gothic typeface, even if the pattern 80 is made up of a monochrome, i.e., a single image area, the character easily blurs. In a case where such a character is formed of multiple image areas, e.g., the image area in the C color plate and the image area in the M color plate, even if a small amount of positional deviation occurs in the image area, a blank area in the character is sometimes filled in. An explanation is given of an operation to form an exposure pattern of an image pattern 800 in a predetermined area of the image pattern 80.

Figure 44:
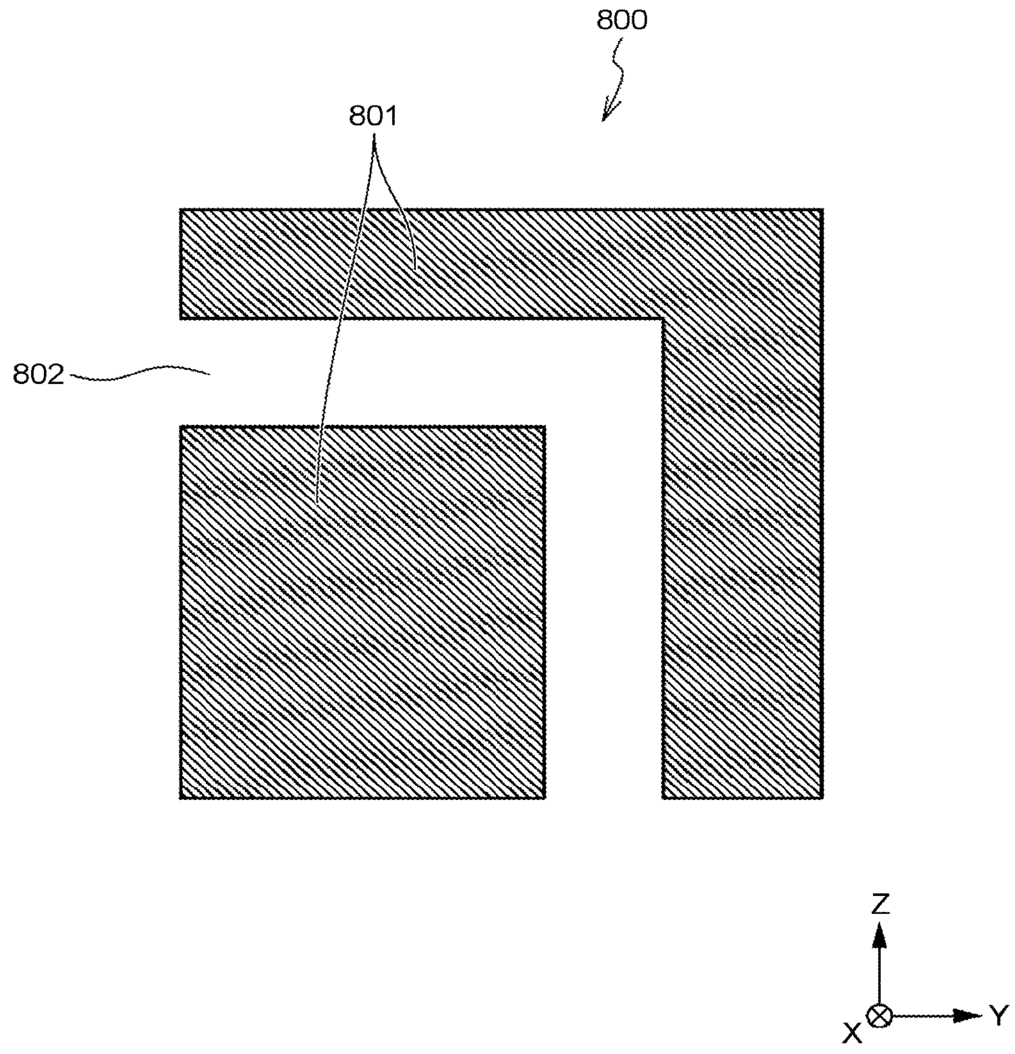
FIG. 44 is a schematic view that illustrates a predetermined area of the image pattern of FIG. 43.

As illustrated in FIG. 44, the image pattern 800 is, for example, part of "車" on the upper side of the character "轟". In the image pattern 800, a non-image area 802 like a long and thin groove is sandwiched between image areas 801. In this case, assume that the operation to enhance a void line is selected for the image pattern 800 so that first priority is given to reproduction of the non-image area 802.

Figure 45:
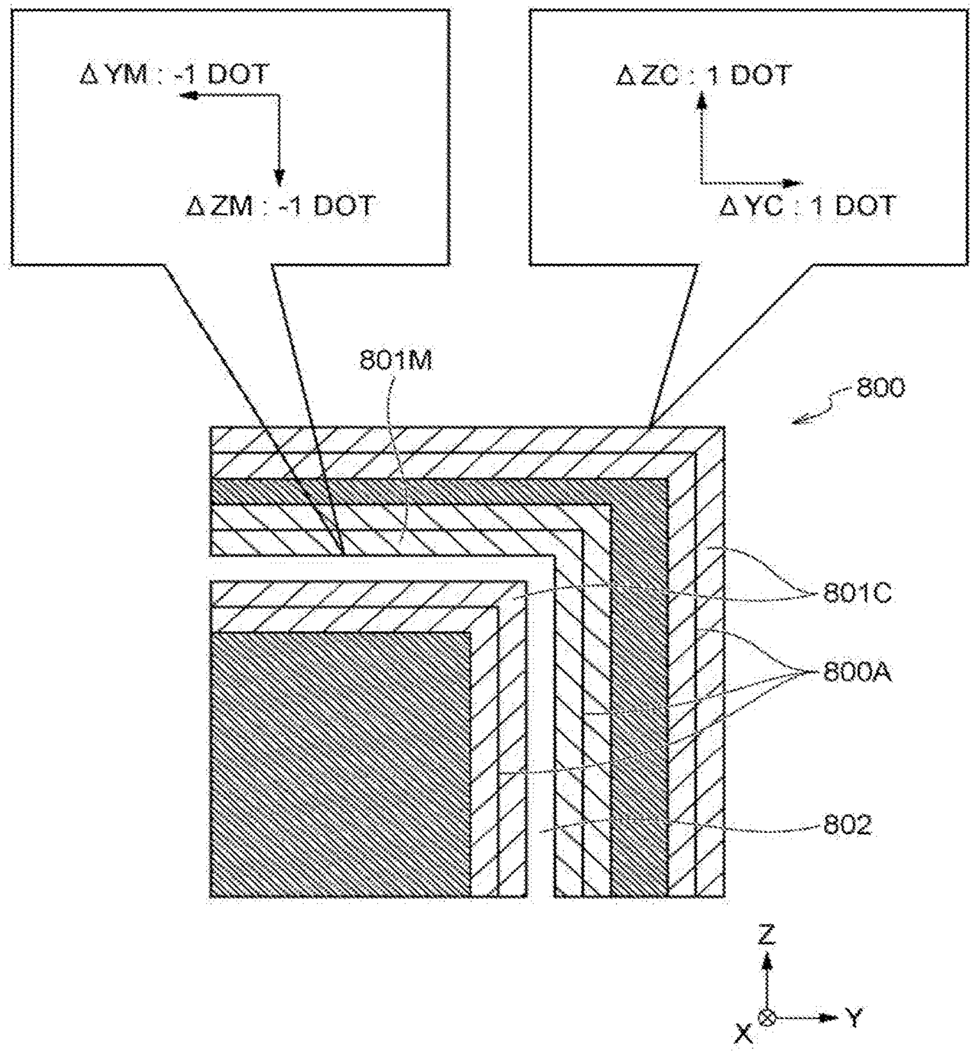
FIG. 45 is a schematic view that illustrates the image pattern of the predetermined area in which a positional deviation occurs in further another example of the operation to form an exposure pattern.

As illustrated in FIG. 45, in the example of the above-described image pattern 800, the positional deviation occurs in an image area 801C in the C color plate, where an image area 801M in the M color plate is used as a reference. In this case, if the image area 801M is used as a reference, the amount of positional deviation of the image area 801C is 2 dots in the main scanning direction and 2 dots in the sub-scanning direction. In this case, a substantial portion of the non-image area 802 is occupied by the image area 801C in which the positional deviation occurs.

An average position 800A, which corresponds to the middle position between multiple image areas, i.e., the image area 801C and the image area 801M, is located by 1 dot in the main scanning direction and by 1 dot in the sub-scanning direction relative to each of the image area 801C and the image area 801M. Therefore, the amount of positional deviation of the image area 801C with the average position 800A as a reference is ΔYC=1 dot and ΔZC=1 dot. Furthermore, the amount of positional deviation of the image area 801M with the average position 800A as a reference is ΔYM=−1 dot and ΔZM=−1 dot.

Figure 46:
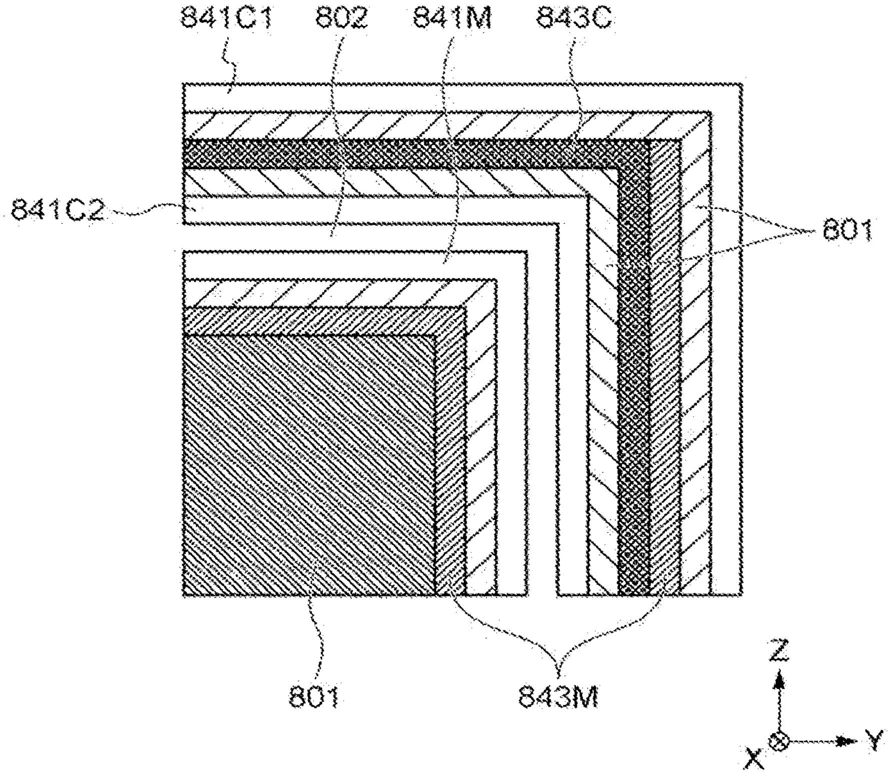
FIG. 46 is a schematic view that illustrates an exposure pattern in further another example of the operation to form an exposure pattern.

With the electrostatic latent-image forming method according to the present embodiment, an exposure pattern of the time concentration exposure is determined so as to reduce the above-described amount of positional deviation. As illustrated in FIG. 45, in the image pattern 800, the image area 801C is shifted from the average position 800A by 1 dot in the main scanning direction and by 1 dot in the sub-scanning direction. As illustrated in FIG. 46, to eliminate the amount of positional deviation that occurs in the image area 801C, pixels of the image area 801C in each of the above-described directions are set as non-exposure pixel groups 841C1 and 841C2. Similarly, as illustrated in FIG. 45, in the image pattern 800, the image area 801M is shifted from the average position by −1 dot in the main scanning direction and by −1 dot in the sub-scanning direction. To eliminate the amount of positional deviation that occurs in the image area 801M, pixels of the image area 801M in each of the above-described directions are set as a non-exposure pixel group 841M.

With regard to the image area 801C, the exposure amount that is reduced by disposing the non-exposure pixel groups 841C1 and 841C2 is added to a high-output exposure pixel group 843C that is on the opposite side with reference to the edge of the image pattern 800, i.e., that is disposed on the area by −1 dot in the main scanning direction and by −1 dot in the sub-scanning direction from the edge toward the center of image area. Furthermore, with regard to the image area 801M, the exposure amount that is reduced by disposing the non-exposure pixel group 841M is added to a high-output exposure pixel group 843M that is on the opposite side with reference to the edge of the image pattern 800, i.e., that is disposed on the area by 1 dot in the main scanning direction and by 1 dot in the sub-scanning direction from the edge toward the center of image area. The optical output values of the high-output exposure pixel groups 843C and 843M are 200% of the target exposure output value.

Thus, with the electrostatic latent-image forming method according to the present embodiment, it is possible to prevent the non-image area 802 from being filled in due to the positional deviation; thus, characters/graphics may be formed with high reproducibility. That is, the electrostatic latent-image forming method according to the present embodiment makes it possible to improve the image quality of image patterns that include multiple image areas.

Furthermore, with the electrostatic latent-image forming method according to the present embodiment, even if the amount and the direction of positional deviation are different in each area of the image data, the amount of correction may be changed for each area.

Furthermore, according to the present embodiment that is described above, an explanation is given of only the example in which the exposure amount that is reduced by disposing a non-exposure pixel group is equal to the exposure amount that is added to a high-output exposure pixel group and the integrated light intensity is constant; however, the foregoing is not a limitation on the present invention. That is, according to the present invention, the light intensity that is reduced by a non-exposure pixel group may exceed the light intensity that is added to a high-output exposure pixel group, and the light intensity that is added to a high-output exposure pixel group may exceed the light intensity that is reduced by a non-exposure pixel group.

Furthermore, the present invention is not limited to the above-described resolution, or the like, and is applicable to images with higher resolution.

Flowchart of the Electrostatic Latent Image Formation Process

Figure 47:
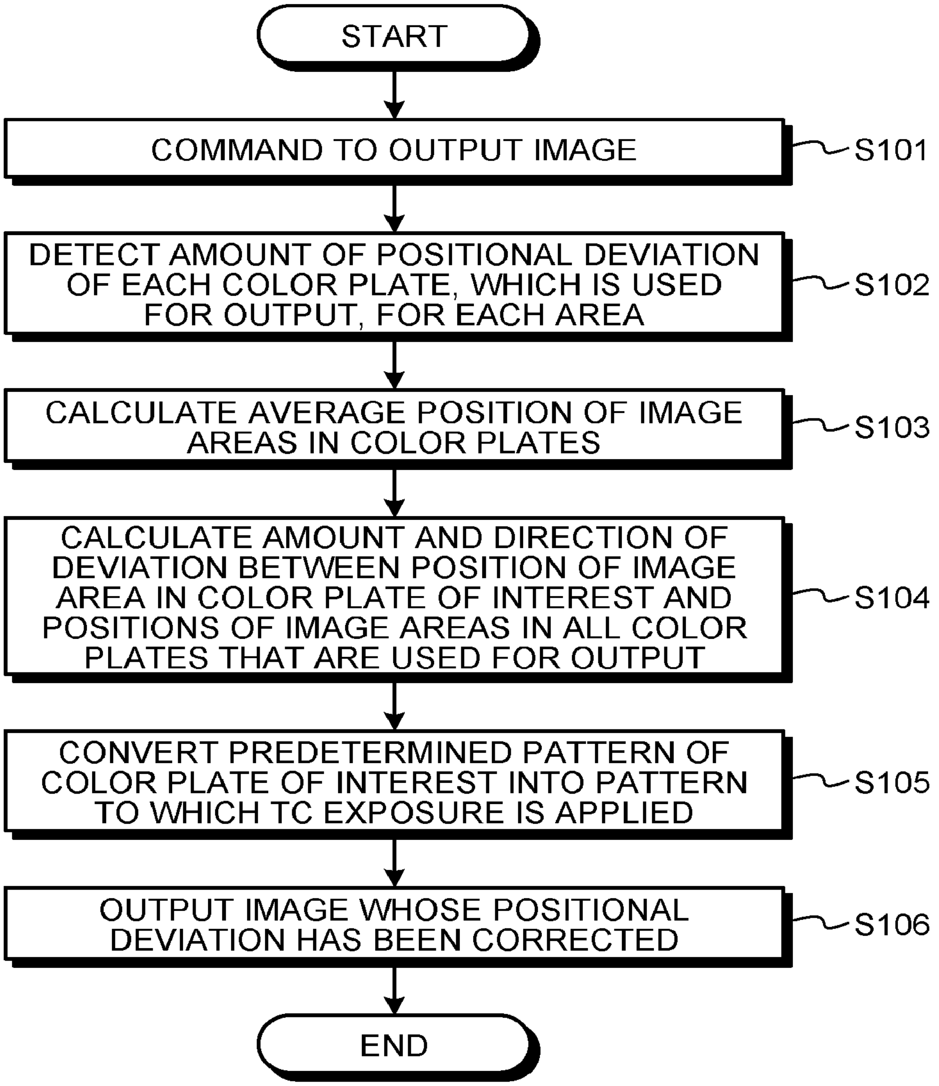
FIG. 47 is a flowchart that illustrates an example of the method for forming an electrostatic latent image according to the present embodiment.

By using the flowchart of FIG. 47, an explanation is given of the electrostatic latent-image forming method according to the present embodiment.

When the laser printer 1000 receives a command to output the image data from a scanner 10, a computer, or the like (S101), the image processing section 1060*a* and the exposure-amount setting unit 1060*b* of the printer control device 1060 perform the following operation.

After the image processing section 1060*a* receives the image data, the image processing section 1060*a* uses the positional-deviation detection pattern 81 of the positional-deviation detection chart 900, illustrated in FIG. 30, to detect the amounts of positional deviations of image areas in different color plates, which are used to output the image, for each area on which the positional-deviation detection pattern 81 is disposed (S102).

The image processing section 1060*a* calculates the average position of the center positions (hereafter, referred to as the "predetermined pattern centers") of the image areas in the color plates, which are used for output, based on the amounts of positional deviations of the image areas, detected for each area (S103).

The image processing section 1060*a* calculates the amount of positional deviation of each color plate in the main scanning direction and in the sub-scanning direction based on the average position of the color plates and the average position of the image areas in the color plates, which are used to output the image (S104).

The exposure-amount setting unit 1060*b* converts the exposure patterns of the image areas into the exposure patterns, to which the time concentration exposure is applied, based on the calculated amount of positional deviation and the optical output value (S105). After the exposure pattern is formed, the laser printer 1000 outputs the image whose positional deviation has been corrected (S106).

Application Example (4) of the Time Concentration Exposure

An explanation is given of a different application example of the time concentration exposure using the electrostatic latent-image forming method according to the present embodiment. The present embodiment is different from the above-described example in the operation to detect the amount of positional deviation using the positional-deviation detection chart and in the method of applying the time concentration exposure based on the detected amount of positional deviation.

Figure 48:
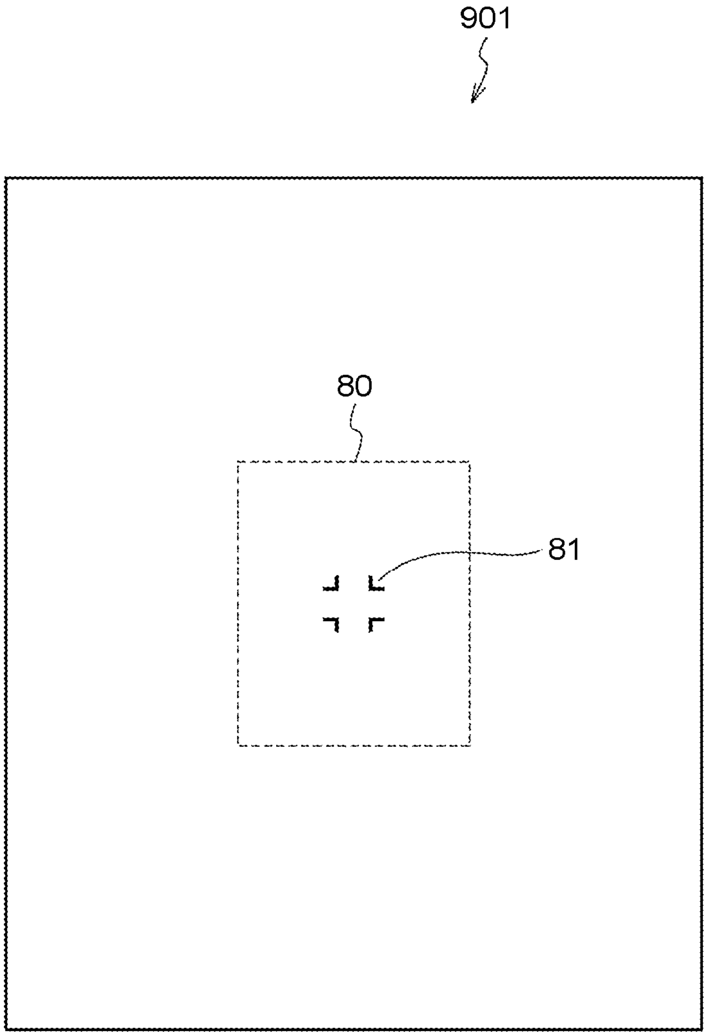
FIG. 48 is a schematic view that illustrates another example of the positional-deviation detection chart.

As illustrated in FIG. 48, a positional-deviation detection chart 901 is different from the above-described positional-deviation detection chart 900 in that an area 80 is disposed on a predetermined position on the printed sheet surface, e.g., the central area, and that the positional-deviation detection pattern 81 is presented on the area 80. Using the positional-deviation detection chart 901, it is possible to determine the presence or absence of deviation of a color plate and the amount of deviation.

With the electrostatic latent-image forming method according to the present embodiment, the time concentration exposure is applied to the entire image pattern in the same manner as in the above-described example based on the amount of positional deviation of part of the image pattern, detected using the positional-deviation detection chart 901.

Flowchart of an Operation to Form an Electrostatic Latent Image

Figure 49:
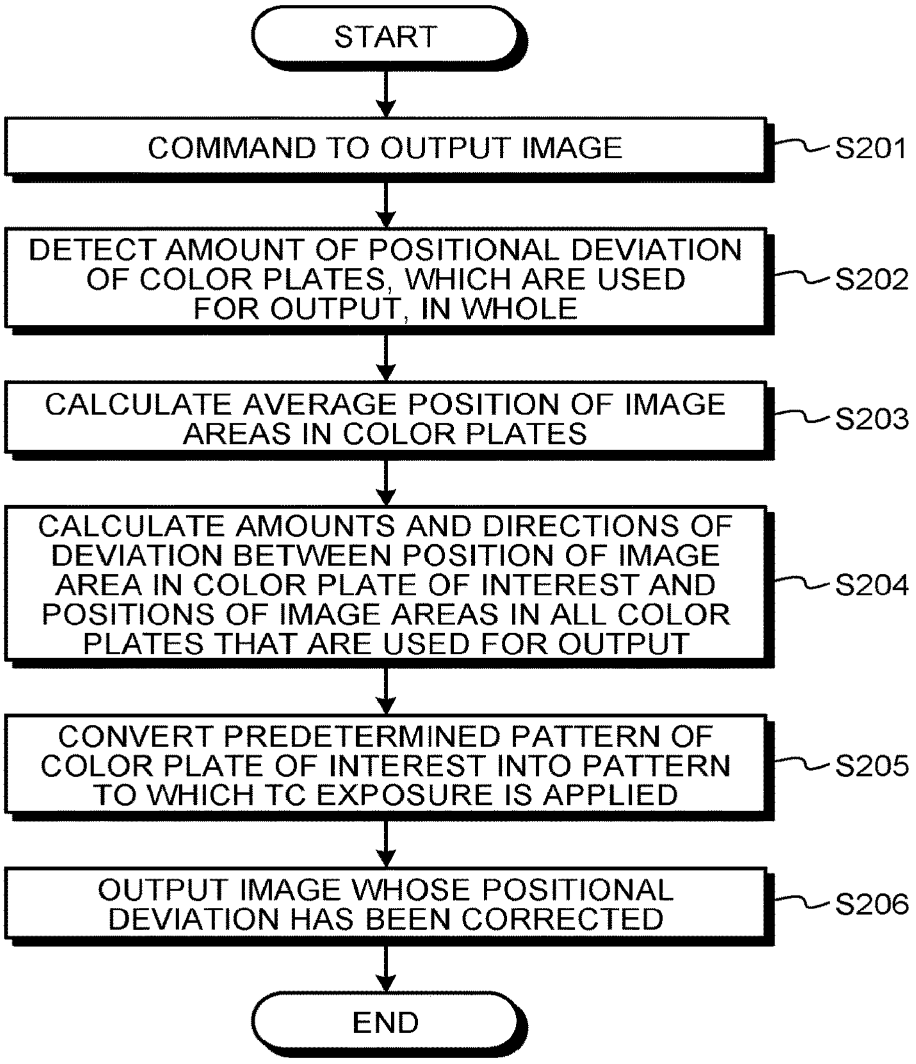
FIG. 49 is a flowchart that illustrates another example of the method for forming an electrostatic latent image according to the present embodiment.

By using the flowchart of FIG. 49, an explanation is given of the electrostatic latent-image forming method according to the present embodiment.

When the laser printer 1000 receives a command to output the image data from the scanner 10, a computer, or the like (S201), the image processing section 1060*a* and the exposure-amount setting unit 1060*b* of the printer control device 1060 perform the following operation.

After the image processing section 1060*a* receives the image data, the image processing section 1060*a* uses the positional-deviation detection pattern 81 of the positional-deviation detection chart 901 to detect the amounts of positional deviations of image areas in different color plates of the entire image pattern, which is used to output the image (S202).

The image processing section 1060*a* calculates the average position of the center positions (hereafter, also referred to as the "predetermined pattern centers") of the image areas in the color plates, which are used for output, based on the detected amounts of positional deviations of the image areas of the entire image pattern (S203).

The image processing section 1060*a* calculates the amount of positional deviation of each color plate in the main scanning direction and in the sub-scanning direction based on the average position of the color plates and the average position of the image areas of the color plates, which are used to output the image (S204).

The exposure-amount setting unit 1060*b* converts the exposure patterns of multiple image areas into the exposure patterns, to which the time concentration exposure is applied, based on the calculated amount of positional deviation and the optical output value (S205). After the exposure pattern is formed, the laser printer 1000 outputs the image whose positional deviation has been corrected (S206).

Thus, with the electrostatic latent-image forming method according to the present embodiment, it is possible to improve the image quality of an image pattern that includes multiple image areas.

According to an embodiment, it is possible to form an image that includes multiple image areas with a high image quality.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming method, comprising:

identifying a position of a reference area and a position of an image area on a surface of a recording medium for forming thereon an image pattern of an image;

setting a first part of pixels of an exposure pattern that corresponds to a first portion of the image area outside the reference area as a non-exposure pixel group;

setting a second part of the pixels of the exposure pattern that corresponds to a second portion of the image area on an edge of the image area as a high-output exposure pixel group, the first portion and the second portion of the image area being on opposite sides of the image area;

exposing a surface of an image bearer to form an electrostatic latent image on the surface of the image bearer, including exposing a third part of the pixels different from the non-exposure pixel group and the high-output exposure pixel group according to a predetermined optical output value, and exposing the high-output exposure pixel group according to an optical output value that is higher than the predetermined optical output value; and forming the image on the recording medium based on the electrostatic latent image.

2. The image forming method according to claim 1, wherein the position of the reference area is specified in accordance with an average position of the image area and one or more other image areas on the surface of the recording medium for forming thereon one or more other image patterns of the image, and the image pattern and the one or more other image patterns correspond to a same portion of the image for different color plates.

3. The image forming method according to claim 1, wherein a width of the first, portion of the image area along a particular scanning direction and a width of the second portion of the image area along the particular scanning direction are the same.

4. The image forming method according to claim 1, wherein the optical output value for exposing the high-output exposure pixel group is set to 200% of the predetermined optical output value.

5. An image forming method, comprising:

identifying a first position of a first image area on a surface of a recording medium for forming thereon a first image pattern of an image;

identifying a second position of a second image area on the surface of the recording medium for forming thereon a second image pattern of the image, the first image pattern and the second image pattern corresponding to a same portion of the image;

setting a first part of pixels of a first exposure pattern that corresponds to a first portion of the first image area as a first non-exposure pixel group in accordance with the first position and a middle position between the first and second positions;

setting a second part of the pixels of the first exposure pattern that corresponds to a second portion of the first image area on an edge of the first image area as a first high-output exposure pixel group in accordance with a width of the first portion of the first image area, the first portion and the second portion of the first image area being on opposite sides of the first image area;

exposing a surface of an image bearer to form a first electrostatic latent image on the surface of the image bearer, including exposing a third part of the pixels of the first exposure pattern different from the first non-exposure pixel group and the first high-output exposure pixel group according to a predetermined optical output value, and exposing the first high-output exposure pixel group according to an optical output value that is higher than the predetermined optical output value; and forming the image on the recording medium based on the first electrostatic latent image.

6. The image forming method according to claim 5, further comprising:

setting a fourth part of pixels of a second exposure pattern that corresponds to a third portion of the second image area as a second non-exposure pixel group in accordance with the second position and the middle position between the first and second positions;

setting a fifth part of the pixels of the second exposure pattern that corresponds to a fourth portion of the second image area on an edge of the second image area as a second high-output exposure pixel group in accordance with a width of the third portion of the second image area, the third portion and the fourth portion of the second image area being on opposite sides of the second image area; and exposing the surface of the image bearer to form a second electrostatic latent image on the surface of the image bearer, including exposing a sixth part of the pixels of the second exposure pattern different from the second non-exposure pixel group and the second high-output exposure pixel group according to the predetermined optical output value, and exposing the second high-output exposure pixel group according to the optical output value that is higher than the predetermined optical output value, wherein the forming the image on the recording medium is further based on the second electrostatic latent image.

7. The image forming method according to claim 5, wherein the optical output value for exposing the high-output exposure pixel group is set to 200% of the predetermined optical output value.

8. The image forming method according to claim 5, wherein the first image pattern and the second image pattern corresponds to the same portion of the image for different color plates.

9. An image forming apparatus, comprising:

circuitry configured to:

identify a position of a reference area and a position of an image area on a surface of a recording medium for forming thereon an image pattern of an image;

set a first part of pixels of an exposure pattern that corresponds to a first portion of the image area outside the reference area as a non-exposure pixel group; and set a second part of the pixels of the exposure pattern that corresponds to a second portion of the image area on an edge of the image area as a high-output exposure pixel group, the first portion and the second portion of the image area being on opposite sides of the image area;

an image bearer configured to form the image on the recording medium based on an electrostatic latent image formed on the image bearer; and an exposure device coupled with the circuitry and configured to expose a surface of the image bearer to form the electrostatic latent image by exposing a third part of the pixels different from the non-exposure pixel group and the high-output exposure pixel group according to a predetermined optical output value, and exposing the high-output exposure pixel group according to an optical output value that is higher than the predetermined optical output value.

10. The image forming apparatus according to claim 9, wherein the circuitry is configured to specify the position of the reference in accordance with an average position of the image area and one or more other image areas on the surface of the recording medium for forming thereon one or more other image patterns of the image, and the image pattern and the one or more other image patterns correspond to a same portion of the image for different color plates.

11. The image forming apparatus according to claim 9, wherein the circuitry is configured to set the second part of the pixels of the exposure pattern that corresponds to the second portion of the image area as the high-output exposure pixel group in a manner that a width of the first portion of the image area along a particular scanning direction and a width of the second portion of the image area along the particular scanning direction are the same.

12. The image forming apparatus according to claim 9, wherein the circuitry is configured to set the optical output value for exposing the high-output exposure pixel group to 200% of the predetermined optical output value.

* * * * *